(12) United States Patent  
Inomori et al.

(10) Patent No.: US 8,151,926 B2  
(45) Date of Patent: Apr. 10, 2012

(54) FRICTION CLUTCH AND VEHICLE EQUIPPED WITH THE SAME

(75) Inventors: Toshinori Inomori, Shizuoka (JP); Yousuke Ishida, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 430 days.

(21) Appl. No.: 12/570,899

(22) Filed: Sep. 30, 2009

(65) Prior Publication Data

US 2010/0089679 A1 Apr. 15, 2010

(30) Foreign Application Priority Data

Oct. 10, 2008 (JP) .................................. 2008-264600

(51) Int. Cl.
*B62D 61/02* (2006.01)

(52) U.S. Cl. ..... 180/219; 192/35; 192/54.52; 192/70.23

(58) Field of Classification Search .................. 180/219; 192/35, 54.52, 70.23, 83, 85.5, 96
See application file for complete search history.

(56) References Cited

U.S. PATENT DOCUMENTS

| 8,037,985 B2 * | 10/2011 | Inomori et al. ................. 192/35 |
| 2004/0238315 A1 | 12/2004 | Drussel |
| 2009/0211868 A1 * | 8/2009 | Inomori et al. ................. 192/83 |
| 2009/0250304 A1 * | 10/2009 | Inomori et al. ............ 192/54.52 |
| 2010/0078289 A1 * | 4/2010 | Gokan et al. ............. 192/93 B |
| 2010/0089681 A1 * | 4/2010 | Inomori et al. ............... 180/219 |
| 2011/0308910 A1 * | 12/2011 | Mooz .......................... 192/66.3 |

FOREIGN PATENT DOCUMENTS

| EP | 2 063 142 A2 | 5/2009 |
| JP | 52-4955 A | 1/1977 |
| JP | 08-232981 | 10/1996 |

\* cited by examiner

*Primary Examiner* — Tashiana Adams

(74) *Attorney, Agent, or Firm* — Keating & Bennett, LLP

(57) ABSTRACT

A friction plate (131) rotates in association with rotation of a pressure plate (77). A first pressing plate (132) presses the friction plate (131) to the right to move the pressure plate (77) to the right. A second pressing plate (133) receives a torque of the pressure plate (77) via the friction plate (131). A slide shaft (231) rotates together with the second pressing plate (133). The operation assist mechanism (220) gives a rightward force to the pressure plate (77), by the slide shaft (231) moving to the right upon receiving the torque from the second pressing plate (133). Balls (135) transmit a portion of the rightward force of the short push rod (43*a*) to the slide shaft (231) without use of the friction plate (131).

18 Claims, 12 Drawing Sheets

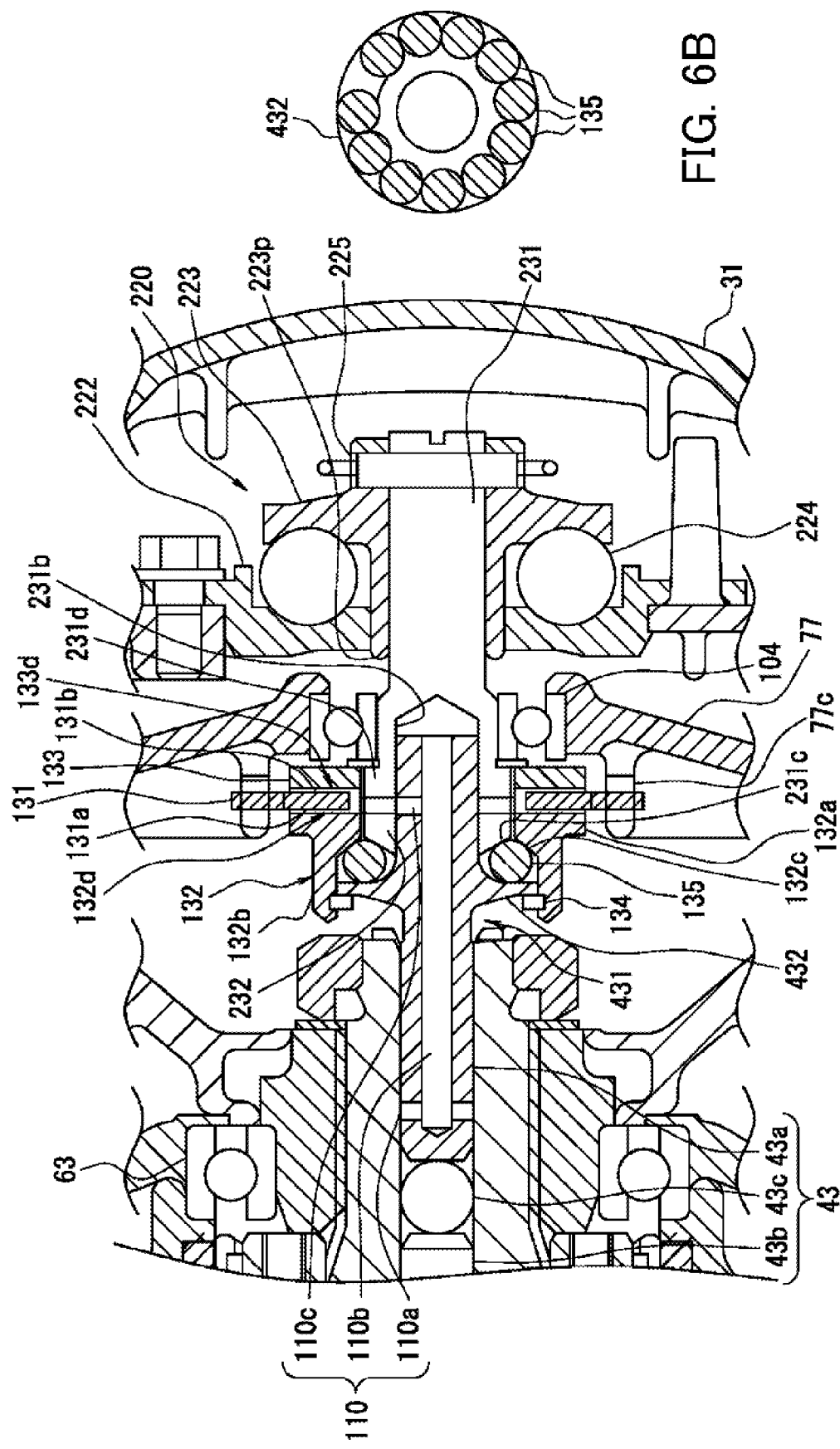

FRICTION CLUTCH AND VEHICLE EQUIPPED WITH THE SAME

This application claims priority to Japanese Patent Application No. 2008-264600 filed on Oct. 10, 2008, the entire disclosure of which is incorporated herein by reference in its entirety.

BACKGROUND

1. Field of the Invention

The preferred embodiments of the present invention relate, inter alia, to a friction clutch and a vehicle equipped with the friction clutch.

2. Description of the Related Art

Vehicles equipped with a friction clutch for connecting and disconnecting engine power transmission and a clutch operator for operating the friction clutch are conventionally known. For example, motorcycles are provided with a clutch lever as the clutch operator.

Generally, as a vehicle increases in size, the friction clutch will increase in capacity correspondingly, and the force required for disengaging the friction clutch will increase accordingly. As a consequence, the driver's burden in clutch operation increases. In order to reduce the rider's burden in clutch operation, it has been proposed to add the so-called operation assist mechanism to the friction clutch (for example, see JP S52-004955 A (hereinafter referred to as "Patent Document 1") and Japanese Patent No. 3381442 (hereinafter referred to as "Patent Document 2")).

The friction clutch having an operation assist mechanism described in Patent Document 1 is provided with a drive-side rotating member having a power-transmitting-side plate, a driven-side rotating member having a power-transmitted-side plate, and a pressure plate for bringing the power-transmission-side plate and the power-transmitted-side plate into pressure contact with each other by receiving an urging force from a pressure-contact spring. This friction clutch has an operation assist mechanism comprising a pressing member that integrally rotates together with the driven-side rotating member, a torque transmission member that faces the pressing member across the friction plate, and a ball cam that moves the pressure plate in a direction in which the power-transmission-side plate and the power-transmitted-side plate separate from each other when the torque transmission member receives torque. The friction clutch also is equipped with an operating shaft for moving the pressing member toward the torque transmission member at the time of disengaging the clutch, and a clutch operator that imparts a force for moving the pressing member toward the torque transmission member to the operating shaft.

In the friction clutch described in Patent Document 1, at the time of disengaging the clutch, the pressing member is pressed against the torque transmission member via the friction plate to impart torque from the pressing member to the torque transmission member. This enables the ball cam to move the pressure plate in the direction in which the power-transmitting-side plate and the power-transmitted-side plate separate from each other. Therefore, in this friction clutch, a part of the torque of the driven-side rotating member is utilized as the force for separating the power-transmitting-side plate and the power-transmitted-side plate away from each other. As a result, this friction clutch can reduce the force necessary for separating the power-transmitting-side plate and the power-transmitted-side plate away from each other. Note that in the following description, the member formed by the pressing member, the friction plate, and the torque transmission member will be referred to as a "sub-clutch."

The force necessary for disengaging the clutch described above is a force exceeding the urging force of the pressure-contact spring, etc. Here, the force necessary for disengaging the clutch is denoted as an operating force P. In the friction clutch having an operation assist mechanism, the operating force P is the resultant force of a force input from the clutch operator (referred to as an "operation input," denoted as "$f_1$"), and a force with which the operation assist mechanism additionally gives for disengaging the clutch (referred to as an "assist force," and denoted as "$f_2$"). In other words, when the clutch is kept in a disengaged state, the equation $P=f_1+f_2$ is established between the operating force P, the assist force $f_2$, and the operation input $f_1$. The operation force P is a constant value. Here, the magnitude of the assist force depends on the magnitude of the friction force generated between the friction plate and the torque transmission member. On the other hand, the magnitude of the just-mentioned friction force depends on the magnitude of the force with which the pressing member presses the friction plate toward of the torque transmission member, i.e., the magnitude of the operation input. Thus, the magnitude of the assist force, after all, depends on the magnitude of the operation input. Accordingly, the relation between the assist force and the operation input is defined as an assist ratio $A=f_2/f_1$. Hence, the equation $P=f_1(1+A)$ is established between the operating force P, and the assist ratio A, and the operation input $f_1$.

There is a demand for a reduction of $f_2$ depending on the specifications of the vehicle equipped with the friction clutch, the operator who operates the friction clutch, or the like. For example, there may be a case in which reduction of the assist force is desired for the purpose of reducing the noise or vibration produced around the operation assist mechanism or adjusting of the clutch operating force.

However, the operation force P is represented as the equation $P=f_1+f_2$ and that the operating force P is a constant value as explained above, and therefore in the case of decreasing $f_2$, $f_1$ should be increased. However, the increased $f_1$ increases the force with which the pressing member presses the torque transmission member via the friction plate. As a consequence, the friction forces produced between the pressing member and the friction plate and between the friction plate and the torque transmission member will increase, which in turn increases the load to the pressing member, the friction plate, and the torque transmission member. For this reason, merely reducing $f_2$ poses a concern about the durability of the pressing member, the friction plate, and the torque transmission member.

On the other hand, in order to ensure the durability of the pressing member, the friction plate, and the torque transmission member, it can be considered, for example, to increase the sizes of the pressing member, the friction plate, and the torque transmission member to enhance their strength. This, however, results in an increase of the clutch in size.

The description herein of advantages and disadvantages of various features, embodiments, methods, and apparatus disclosed in other publications is in no way intended to limit the present invention. For example, certain features of the preferred embodiments of the invention may be capable of overcoming certain disadvantages and/or providing certain advantages, such as, e.g., disadvantages and/or advantages discussed herein, while retaining some or all of the features, embodiments, methods, and apparatus disclosed therein.

SUMMARY

The preferred embodiments of the present invention have been developed in view of the above-mentioned and/or other problems in the related art. The preferred embodiments of the present invention can significantly improve upon existing methods and/or apparatuses.

Among other potential advantages, some embodiments can provide a friction clutch equipped with an operation assist mechanism capable of reducing the assist force while maintaining the durability of the friction plate and preventing the friction plate from increasing in size.

Among other potential advantages, some embodiments can provide a vehicle equipped with the aforementioned friction clutch.

According to a first aspect some embodiments of the present invention, a friction clutch comprises: a clutch shaft; a driving-side rotating member having a first plate and rotating centered around an axial center of the clutch shaft; a driven-side rotating member having a second plate facing the first plate; a pressure plate coupled to the driving-side rotating member so as to rotate together with the drive-side rotating member, wherein the pressure plate is configured to move in a first direction that is a direction from one side of an axial direction of the clutch shaft to the other side thereof to bring the first plate and the second plate into contact with each other; a clutch operator; an operating shaft configured to move in a second direction by receiving a force in a direction opposite to the first direction when the clutch operator is operated; a sub-clutch having a friction plate, a pressing member, and a torque transmission member, the pressing member and the torque transmission member sandwiching the friction plate therebetween; the friction plate having a first friction face provided on the other side and a second friction face provided on the one side, and being coupled to the pressure plate such as to rotate together with the pressure plate, the pressing member being arranged so as to face the first friction face and being configured to move in the second direction together with the operating shaft and to contact with the first friction face so as to press the friction plate in the second direction; and the torque transmission member being arranged so as to face the second friction face and being configured to receive the torque of the pressure plate via the friction plate by being pressure-contacted by the friction plate that is pressed by the pressing member; the friction clutch further comprising: a slide shaft coupled to the torque transmission member such as to rotate together with the torque transmission member and also coupled to the pressure plate such as to move along the axial direction together with the pressure plate, wherein the slide shaft is configured to give a force in the second direction to the pressure plate by receiving a torque from the torque transmission member and moving in the second direction; and a transmission member for transmitting, to the slide shaft, a portion of the force in the second direction that is applied to the operating shaft without use of the friction plate when the operating shaft moves in the second direction.

According to a second aspect some embodiments of the present invention, a vehicle is equipped with the aforementioned friction clutch.

The preferred embodiments of the present invention makes it possible to reduce the assist force, while maintaining the durability of the friction plate and preventing the friction plate from increasing in size, in a friction clutch having an operation assist mechanism that imparts an assist force and in a vehicle equipped with the friction clutch.

BRIEF DESCRIPTION OF THE DRAWINGS

The preferred embodiments of the present invention are shown by way of example, and not limitation, in the accompanying figures, in which:

FIGS. 5A to 5C are views illustrating an operation assist mechanism, wherein FIG. 5A is a back-side view of a second cam plate, FIG. 5B is a front-side view of a ball plate, and FIG. 5C is a front-side view of a first cam plate;

FIG. 6A is a partially-enlarged cross-sectional view of the clutch, and FIG. 6B is a partial cross-sectional view of the position in which a plurality of balls are arranged;

DETAILED DESCRIPTION OF THE PREFERRED EMBODIMENTS

Figure 1:
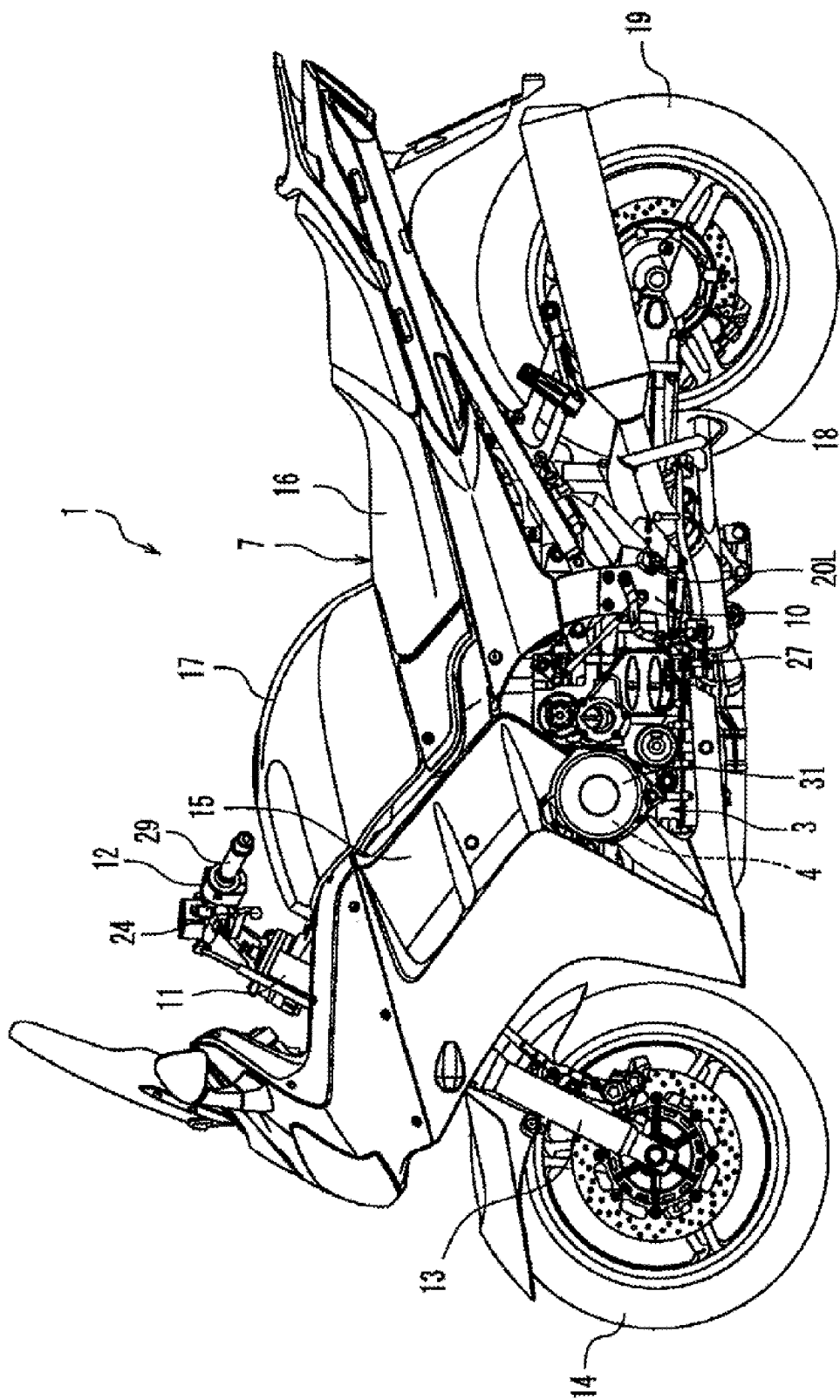
FIG. 1 is a side view of a motorcycle.

In the following paragraphs, some preferred embodiments of the invention will be described by way of example and not limitation. It should be understood based on this disclosure that various other modifications can be made by those in the art based on these illustrated embodiments.

In a conventional friction clutch provided with an operation assist mechanism, if $f_2$ is intended to be decreased, $f_1$ has to be increased, as described above. As a consequence, there is a risk that the durability of the friction plate or the like of the sub-clutch may be degraded. In view of this, the present inventors have contemplated if it is possible to provide a friction clutch that will not cause a size increase even when $f_2$ is reduced. As a result of devoted researches, the present inventors have noted that the entire $f_1$ is used for pressing the friction plate of the sub-clutch in the conventional technology, and have conceived of dividing the force $f_1$ into a force for pressing the friction plate of the sub-clutch (which is denoted as "$f_{1a}$") and a force for moving the pressure plate in a direction in which the power-transmitting-side plate and the power-transmitted-side plate separate from each other without use of the friction plate (which is denoted as "$f_{1b}$"). In other words, the present inventors have conceived that it is possible to suppress the friction force generated on the friction plate even when the operation input $f_1$ becomes greater, by providing a transmission path of the force through which $f_{1b}$ acts on the pressure plate without use of the friction plate, separately from the transmission path of the force through which $f_{1a}$ acts on the friction plate. This makes it possible to reduce $f_2$, while preventing the clutch from increasing in size and the durability of the sub-clutch from degrading.

More specifically, the sub-clutch according to the present invention has two systems of paths, as the paths for transmitting the force inputted to the operating shaft, one being a path that passes through the friction plate and the other being a path that does not pass through the friction plate. In other words, in the friction clutch according to the embodiment of the present invention, the force inputted from the clutch operator at the time of disengaging the clutch is divided into the two systems. Where the operation input is denoted as $f_1'$, the operation input can be expressed as $f_1'=f_{1a}+f_{1b}$. Where the assist force is denoted as $f_2'$, the operating force can be expressed as $P=f_{1a}+f_{1b}+f_2'$.

The magnitude of $f_2'$ depends on the magnitude of the friction force produced on the friction plate. The magnitude of the friction force produced on the friction plate depends on the magnitude of $f_{1a}$. Therefore, the magnitude of $f_2'$, after all, depends on $f_{1a}$. Where it is defined that $B=f_2'/f_{1a}$, the equation $f_2'=B \cdot f_{1a}$ is established, and the operating force P can be expressed as $P=f_{1a}+f_{1b}+f_2'=(1+B) \cdot f_{1a}+f_{1b}=$ constant. Note that "B" is a "conversion rate." Here, even if $f_2'$ is decreased, in other words, even if B is decreased, the relation, "the operating force P=constant" can be maintained without making $f_{1a}$ so large as long as $f_{1b}$ is increased. As a result, the friction force of the friction plate or the like produced at the time of disengaging the clutch can be kept small, and therefore, there is no risk of degrading the durability even when the friction plate is not increased in size. Based on the above-described principle, the clutch according to the present invention makes it possible to reduce the assist force of the operation assist mechanism without increasing the size of the friction plate or the like of the sub-clutch.

Hereinafter, embodiments of the present invention will be described in detail with reference to the drawings. It should be noted, however, that a motorcycle 1 and a clutch 2 described below are merely illustrative of the preferred embodiments of the present invention. The vehicle according to the present invention is not limited to the motorcycle 1 described below. The vehicles according to the present invention are not limited to motorcycles, including the so-called sport-type motorcycle, a moped, and a motor scooter, and can be other types of vehicles, such as, e.g., ATVs (All Terrain Vehicles). In the present invention, the term "motorcycle" refers to a type of vehicle whose vehicle body is to be leaned when taking a turn. The motorcycle referred to herein is not limited to vehicles having two wheels, but may have three or more wheels.

FIG. 1 is a left side view illustrating a motorcycle 1 according to one embodiment. In the following description, the front, rear, right and left directions refer to the respective directions as defined based on the perspective of the rider seated on a seat 16.

Structure of Motorcycle:

As illustrated in FIG. 1, the motorcycle 1 has a vehicle body 7, a front wheel 14 provided at the front side of the vehicle body 7, and a rear wheel 19 provided at the rear side of the vehicle body 7. The vehicle body 7 includes a vehicle body frame 10. The vehicle body frame 10 has a head pipe 11. A handle bar 12 is attached to the upper end of the head pipe 11. The front wheel 14 is attached rotatably to the lower end of the head pipe 11 via front forks 13.

A power unit 3 is suspended from the vehicle body frame 10. A body cover 15 is attached to the vehicle body frame 10. A seat 16 is arranged behind the central a portion of the vehicle body 7. A fuel tank 17 is arranged in front of the seat 16.

A rear arm 18 is supported pivotally by the vehicle body frame 10. The rear wheel 19 is attached rotatably to a rear end portion of the rear arm 18. The rear wheel 19 is coupled to an engine 4 (see FIG. 2) via a power transmission mechanism, which is not illustrated in the drawing. Thereby, the power of the engine 4 is transmitted to the rear wheel 19 to rotate the rear wheel 19.

An accelerator grip, not shown in the drawing, is provided on the right side of the handle bar 12. A left grip 29 is provided on the left side of the handle bar 12. A clutch lever 24, which is to be operated for engaging/disengaging a clutch 2 (see FIG. 2), is provided in front of the left grip 29.

Footrests 20L are provided on both the left and right sides of the vehicle body 7. A shift pedal 27, which is to be operated when changing the transmission gear ratio of a transmission device 5 (see FIG. 2), is provided in front of the left side footrest 20L.

Figure 2:
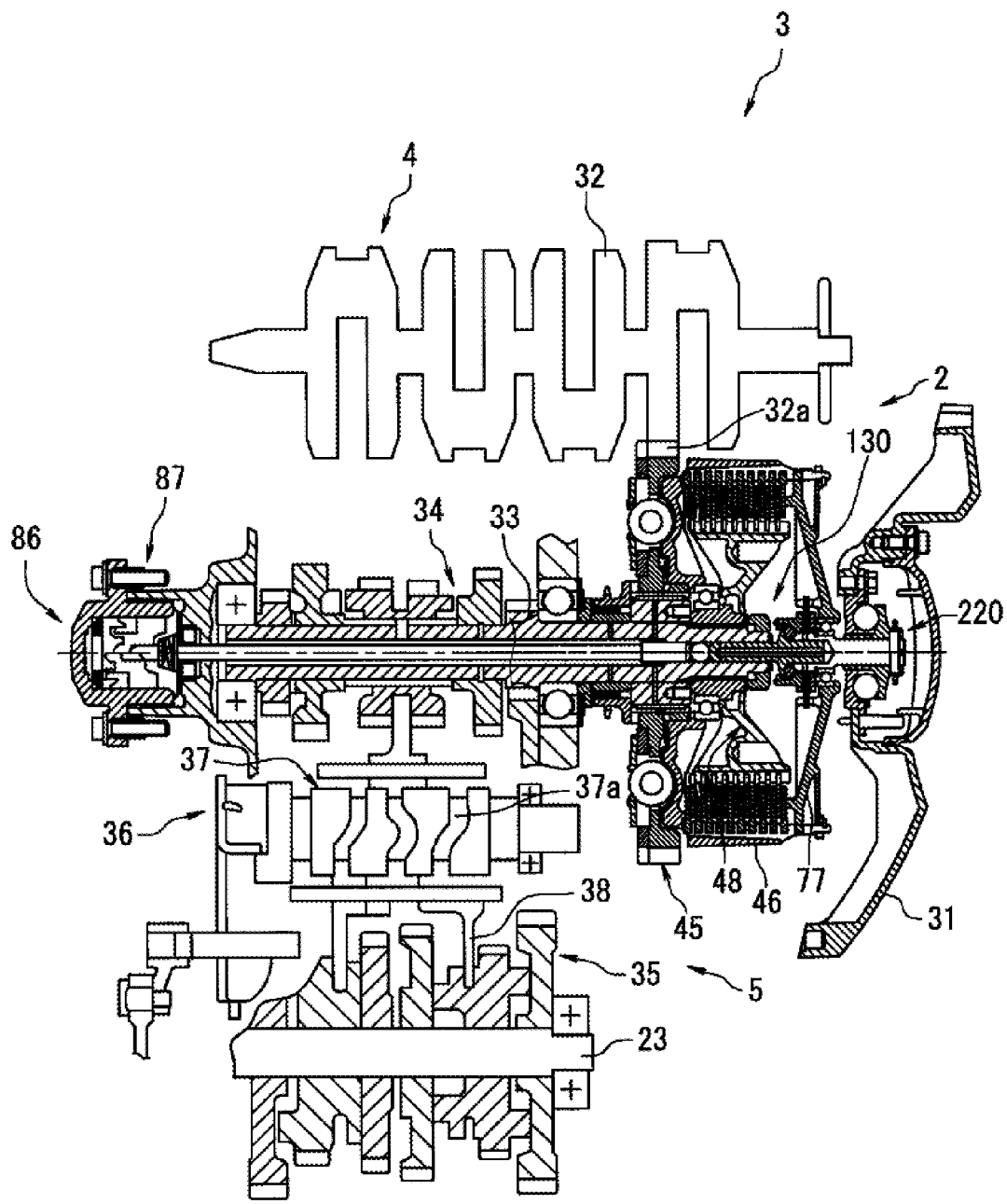
FIG. 2 is a structural view of primary elements of a power unit of the motorcycle.

Structure of Power Unit:

As illustrated in FIG. 2, the power unit 3 includes an engine 4, a transmission 5, and a clutch 2. The type of the engine 4 is not particularly limited. In this embodiment, the engine 4 is a water-cooled four-stroke parallel four-cylinder engine.

Although not shown in the drawings, the engine 4 has four cylinders, pistons that reciprocate inside the cylinders, and a crankshaft 32 coupled to the pistons via connecting rods. The crankshaft 32 extends along a vehicle width direction. Reference numeral "31" denotes a crankcase.

The crankshaft 32 is connected to the transmission device 5 via the clutch 2. The transmission device 5 includes a main shaft 33, a drive shaft 23, and a gear selection mechanism 36. The main shaft 33 is connected to the crankshaft 32 via the clutch 2. The main shaft 33 and the drive shaft 23 are arranged in parallel with the crankshaft 32.

A plurality of transmission gears 34 are attached to the main shaft 33. A plurality of transmission gears 35 corresponding to the plurality of transmission gears 34 are attached to the drive shaft 23. The transmission gears 35 are geared with the transmission gears 34 mutually only by a pair of selected gears. At least one of unselected transmission gears 34 and 35 is capable of rotating with respect to the main shaft 33 or the drive shaft 23. The power transmission between the main shaft 33 and the drive shaft 23 is performed only via the selected transmission gears 34 and 35.

The selection of the transmission gears 34 and 35 is performed by the gear selection mechanism 36. A plurality of cam grooves 37a are formed on the outer circumferential surface of a shift cam 37. A shift fork 38 is attached to each of the cam grooves 37a. Each shift fork 38 is engaged with a predetermined transmission gear 34 of the main shaft 33 and a predetermined transmission gear 35 of the drive shaft 23. In response to the rotation of the shift cam 37, each of the plurality of shift forks 38 is guided by the cam groove 37a, and moves in an axial direction of the main shaft 33. As a result, a mutually engaged pair of gears is selected out of the transmission gears 34 and 35. The gear selection mechanism 36 is operated by the shift pedal 27 (see FIG. 1).

With such a configuration, when the engine 4 is operated after bringing the clutch 2 in an engaged state, the power of the engine 4 is transmitted to the main shaft 33 via the clutch 2. Via a predetermined pair of transmission gears 34 and 35, the power is transmitted from the main shaft 33 to the drive shaft 23, allowing the drive shaft 23 to rotate. As the drive shaft 23 rotates, the power is transmitted to the rear wheel 19 via a transmission mechanism (not shown), such as a chain, connected to the drive shaft 23 and the rear wheel 19. As a result, the rear wheel 19 rotates.

Structure of Clutch:

The clutch 2 is constituted by a wet-type multiple-disc friction clutch. The clutch 2 is engaged/disengaged by the rider's operation of the clutch lever 24. Hereinafter, the structure of the clutch 2 will be described in detail with reference to FIGS. 2, 3, and 4.

a. Clutch Housing

Figure 3:
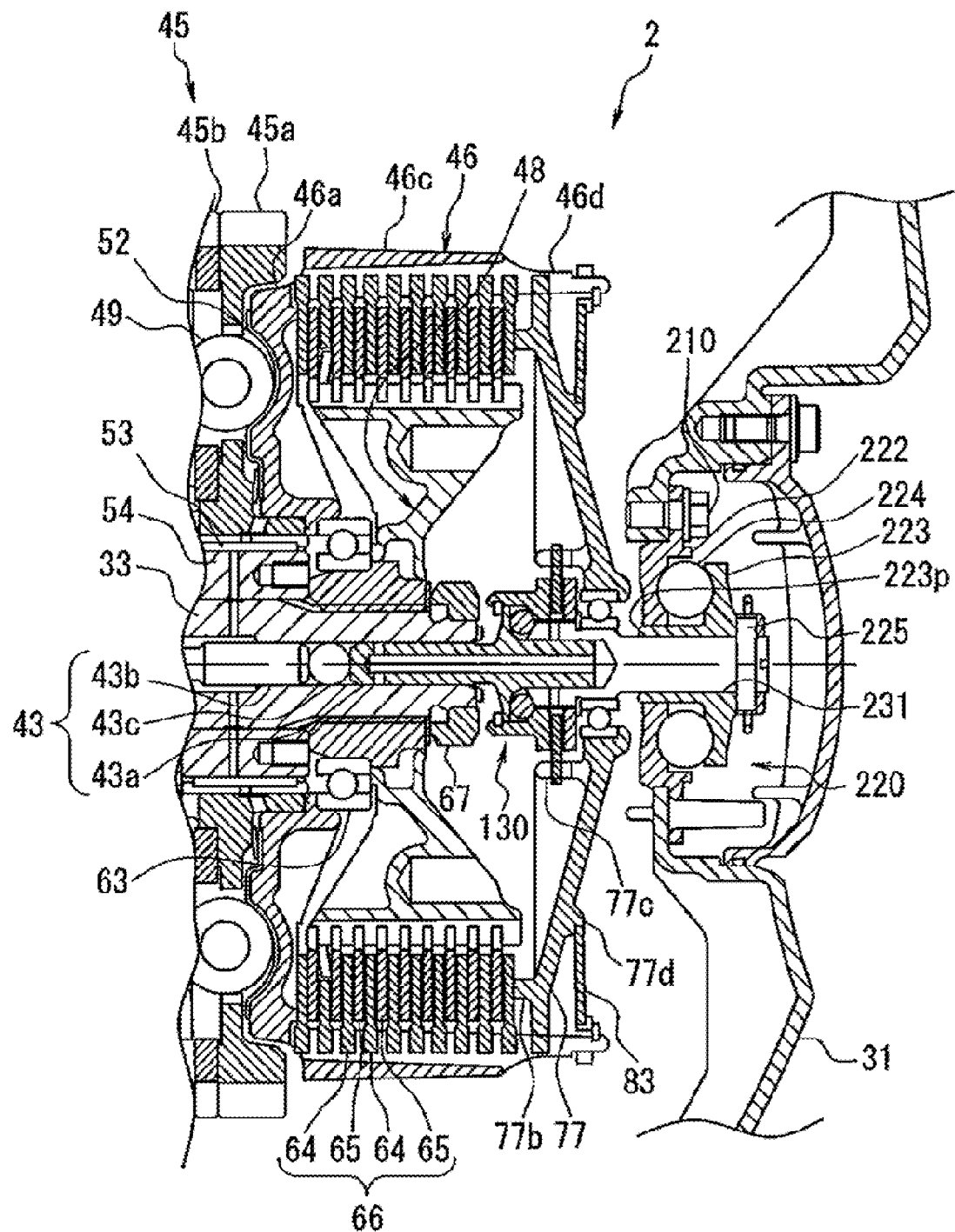
FIG. 3 is a cross-sectional view of a clutch.

As illustrated in FIG. 3, the clutch 2 is equipped with a clutch housing 46. The main shaft 33 penetrates through the clutch housing 46. The clutch housing 46 has a housing main body 46c. The housing main body 46c has a bottom portion 46a so that it is formed substantially in a cylindrical shape. The main shaft 33 is inserted through the bottom portion 46a of the housing main body 46c. The housing body 46c is provided with plural pairs of arms 46d. Each of the arms 46d extends from the bottom portion 46a outwardly along the vehicle width direction.

As illustrated in FIG. 3, the vehicle width direction means a lateral direction, i.e., a left-to-right direction. In this embodiment, since the clutch 2 is arranged on the right side of the main shaft 33, the outside of the vehicle width direction means the right side, and the inside of the vehicle width direction means the left side. Accordingly, in the following explanation, the outside and inside of the vehicle width direction will be referred to simply as "the right side" and "the left side," respectively.

b. Scissors Gear

A scissors gear 45 is attached to the clutch housing 46. The scissors gear 45 includes two gears 45a and 45b, a spring 49, and two plates 51 and 52. The gear 45a and the gear 45b are located between the plates 51 and 52. The gear 45a and the gear 45b are configured to prevent their relative movements along the axial direction but to allow relative rotation along the circumferential direction.

The gear 45a meshes with a gear 32a (see FIG. 2) of the crankshaft 32. The gear 45a is configured to prevent its relative rotation against the bottom portion 46a of the clutch housing 46. In response to rotation of the crankshaft 32, the gear 45a of the scissors gear 45 and the clutch housing 46 rotate integrally.

A needle bearing 53 and a spacer 54 which does not rotate relative to the main shaft 33 are arranged between the scissors gear 45 and the main shaft 33. The scissors gear 45 is capable of rotating relative to the main shaft 33 via the needle bearing 53. In other words, rotation of the scissors gear 45 is not directly transmitted to the main shaft 33.

c. Clutch Boss

A clutch boss 48 is fixed to the main shaft 33 with a nut 67. The clutch boss 48 rotates together with the main shaft 33. A thrust bearing 63 is arranged between the clutch boss 48 and the scissors gear 45. Thereby, the scissors gear 45, the needle bearing 53, and the spacer 54 are restrained from coming closer to the clutch boss 48 more than a predetermined distance. In other words, movements of the scissors gear 45, the needle bearing 53, and the spacer 54 toward the clutch boss 48 are restrained.

d. Plate Group

A plurality of friction plates 64 are arranged inside the clutch housing 46. The friction plates 64 are arranged along the axial direction. Each of the friction plates 64 rotates together with the clutch housing 46. Each of the friction plates 64 is movable in the axial direction. For this reason, the gap between adjacent friction plates 64 is variable. A clutch plate 65 is interleaved between the respective adjacent friction plates 64. The clutch plate 65 faces the friction plates 64. Each of the clutch plates 65 rotates together with the clutch boss 48. Each of the clutch plates 65 is movable in the axial direction, and the gap between adjacent clutch plates 65 is variable. In this embodiment, a plate group 66 is constituted by the friction plates 64 and the clutch plates 65.

e. Pressure Plate

A pressure plate 77 is arranged on the right side of the main shaft 33. The pressure plate 77 is formed in a substantially disk shape. A sub-clutch 130 is provided in a center portion of the pressure plate 77. The radially outward end of the pressure plate 77 is attached to the arms 46d. The pressure plate 77 rotates together with the clutch housing 46.

A pressing part 77b projecting toward the plate group 66 side is formed on a radially outward portion of the pressure plate 77. This pressing part 77b faces the friction plate 64 located on the rightmost side of the plate group 66. When the pressure plate 77 moves to the left, the pressing part 77b presses the plate group 66 to the left. As a result, the friction plates 64 and the clutch plates 65 in the plate group 66 are brought into pressure contact with each other.

In addition, the pressure plate 77 has a slide arm portion 77c provided at a portion of the pressure plate 77 radially inward of the position where the pressing portion 77b is formed, the slide arm portion 77c protruding toward the plate group 66. A friction plate 131 of the sub-clutch 130 is engaged with the slide arm portion 77c so as to be slidable along the axial direction of the main shaft 33. The main shaft 33 constitutes the clutch shaft.

A disc spring 83 is provided on the right side of the pressure plate 77. The disc spring 83 is arranged on the side of the pressure plate 77 opposite to the plate group 66, with respect to the axial direction of the main shaft 33. Note that the pressure plate 77 has a retainer portion 77d provided radially inward of the position where the pressing portion 77b is formed, but radially outward of the position where the slide arm portion 77c is formed. The retainer portion 77d protrudes toward the side in which the disc spring 83 is arranged. The retainer portion 77d protrudes toward the side of the pressure plate 77 opposite to the plate group 66, with respect to the axial direction of the main shaft 33. The disc spring 83 is formed substantially in a disk shape. One radial end of the disc spring 83 is supported by the retainer portion 77d, and the other radial end thereof is supported by the arm 46d of the clutch housing 46.

f. Clutch Release Mechanism

The clutch 2 is provided with a clutch release mechanism. The clutch release mechanism 86 forcibly releases the pressure contact state of the plate group 66 in response to the operation of the clutch lever 24 by a rider. This clutch release mechanism 8 enables disengaging of the clutch 2 by the rider's manual operation.

The clutch release mechanism 86 includes a push mechanism 43 (see FIG. 3) and a drive mechanism 87 (see FIG. 4) for driving the push mechanism 43. As illustrated in FIG. 3, the push mechanism 43 has a short push rod 43a, a long push rod 43b, and a ball 43c interposed between the short push rod 43a and the long push rod 43b. A through-hole 33a (see FIG. 4) is formed inside the main shaft 33, and the push mechanism 43 is arranged inside the through-hole 33a. The through-hole 33a also serves as an oil supply hole for supplying oil to various sliding parts of the clutch 2. The oil is supplied to various sliding parts of the clutch 2 through the gap space between the inner wall of the through-hole 33a and the push mechanism 43.

As illustrated in FIG. 6A, the right end of the short push rod 43a protrudes from the main shaft 33. This portion protruding from the main shaft 33 is a protruding portion 431 of the short push rod 43a. A flange portion 432 that extends radially outward (in the up-and-down directions in FIGS. 3 and 6A) is formed on the protruding portion 431. The flange portion 432 is located leftward of an extension portion 232 of a later-described slide shaft 231. The ball 43c is provided between the short push rod 43a and the long push rod 43b to reduce the slide resistance between the short push rod 43a and the long push rod 43b.

Figure 4:
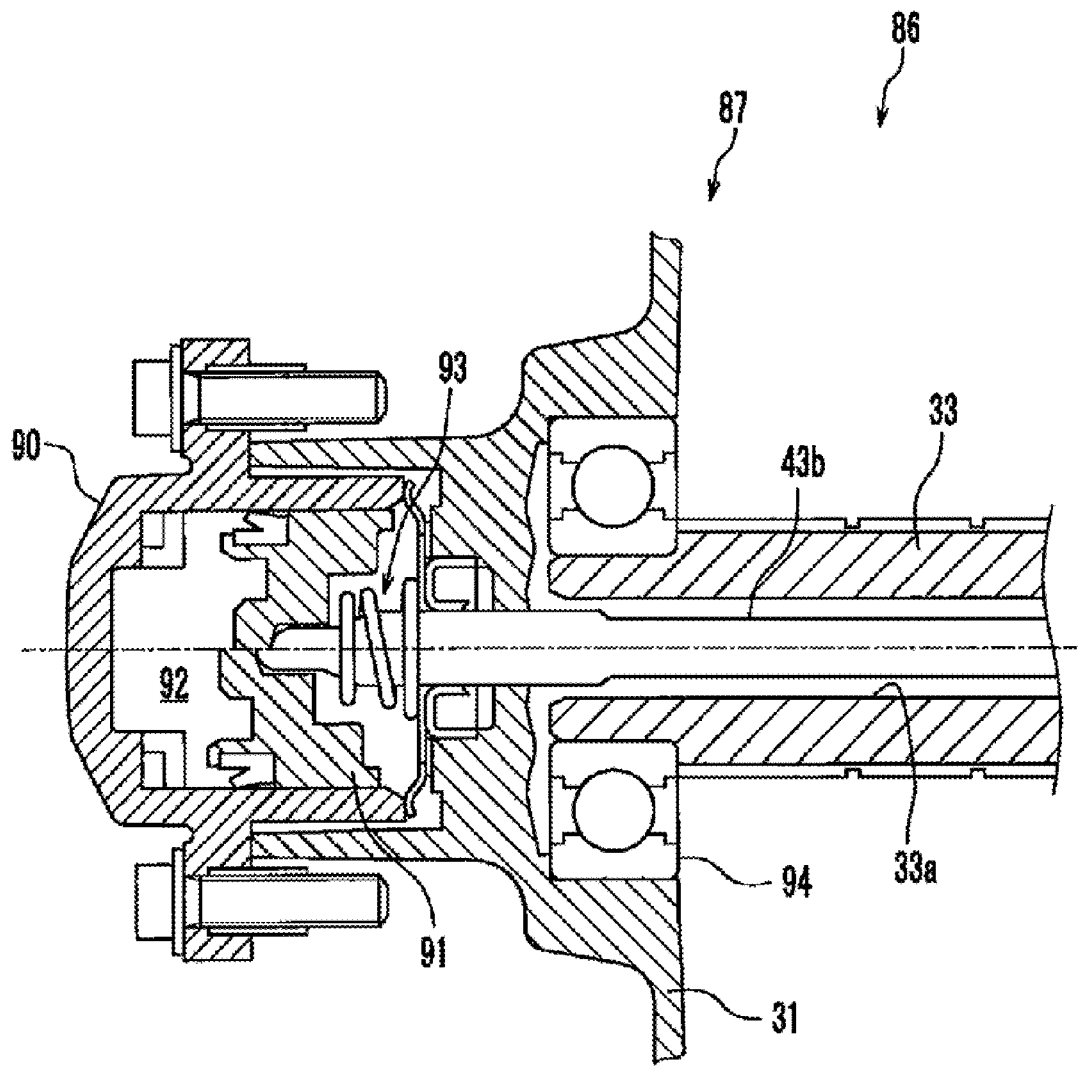
FIG. 4 is a cross-sectional view illustrating a push rod drive mechanism.

FIG. 4 is a cross-sectional view illustrating the drive mechanism 87. As illustrated in FIG. 4, the left end of the long push rod 43b is located leftward of the left end of the main shaft 33. It should be noted that the portion below the axial center of the main shaft 33 in FIG. 4 illustrates a state in which the clutch release mechanism 86 is not driven. In other words, it illustrates the state in which the push mechanism 43 is located relatively to the left and the pressure plate 77 is not displaced to the right by the push mechanism 43. On the other hand, the portion above the axial center of the main shaft 33 in FIG. 4 illustrates a state in which the clutch release mechanism 86 is driven. In other words, it illustrates the state in which the push mechanism 43 is located relatively to the right and the pressure plate 77 is displaced to the right by the push mechanism 43.

As illustrated in FIG. 4, the drive mechanism 87 includes a cylinder 90 and a piston 91. The piston 91 is slidable with respect to the cylinder 90 in the axial directions of the main shaft 33. The piston 91 is attached to the long push rod 43b. Therefore, when the piston 91 slides, the long push rod 43b accordingly moves in the axial directions of the main shaft 33. Between the piston 91 and the cylinder 90, an operating chamber 92 is formed so as to form a partitioned space. The operating chamber 92 is filled with oil.

A compression coil spring 93 is arranged between the piston 91 and the crankcase 31. The piston 91 is urged to the left by the compression coil spring 93. In other words, the piston 91 is urged in a direction in which the push mechanism 43 is displaced to the left to engage the clutch 2. Therefore, when the clutch lever 24 (see FIG. 1) is released by the rider's operation, the push mechanism 43 moves to the left automatically.

g. Operation Assist Mechanism

As illustrated in FIG. 3, the clutch 2 is provided with an operation assist mechanism 220. The operation assist mechanism 220 converts a portion of the torque of the pressure plate 77 into a force of disengaging the clutch 2 to reduce the force necessary for disengaging the clutch 2. The operation assist mechanism 220 according to this embodiment is constituted by the so-called ball cam. The operation assist mechanism 220 includes a first cam plate 222, a second cam plate 223, and a plurality of balls 224. The operation assist mechanism 220 has a later-described slide shaft 231. The operation assist mechanism 220 is arranged to the right of the pressure plate 77.

The operation assist mechanism 220 is provided with three balls 224. The three balls 224 are arranged between the first cam plate 222 and the second cam plate 223 that face each other. The three balls 224 can roll in the space between the first cam plate 222 and the second cam plate 223. The three balls 224 are arranged so as to be equally spaced along the circumferential direction centering on the axial center of the slide shaft 231. It should be noted that the number of balls 224 is not limited to three. As will be described later, the balls 224 can move along the dash-dotted line (which is the center line of the first cam groove 222a and the second cam groove 223a) shown in FIGS. 5A to 5C.

Figure 5C:
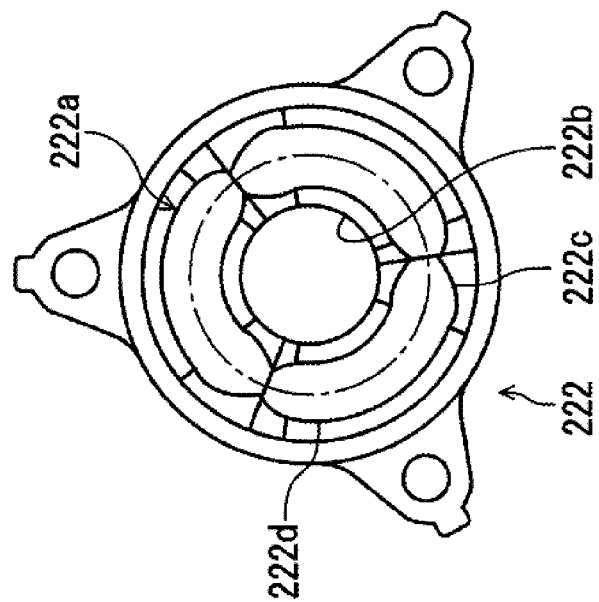
Figure 5B:
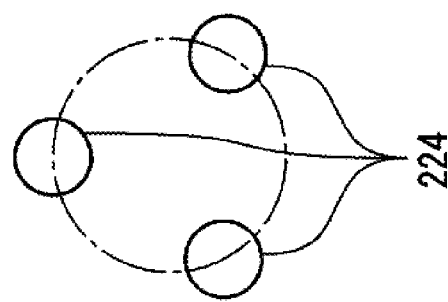

The first cam plate 222 and the second cam plate 223 have substantially a disk shape. A portion of the second cam plate 223, however, has substantially a cylindrical shape. The substantially cylindrical-shaped portion of the second cam plate 223 is referred to as a cylindrical portion 223p. As illustrated in FIG. 5C, a through-hole 222b is formed in a central portion of the first cam plate 222. As illustrated in FIG. 3, the slide shaft 231 and the cylindrical portion 223p are inserted through the through-hole 222b. The cylindrical portion 223p of the second cam plate 223 is rotatable, and movable along the axial direction with respect to the first cam plate 222. In other words, the first cam plate 222 is configured so as not to be rotated even when the second cam plate 223 rotates. In addition, the first cam plate 222 is configured so as not to be moved even when the cylindrical portion 223p of the second cam plate 223 moves along the axial direction.

The first cam plate 222 is fastened to a plurality of fastening members 210 fixed to the crankcase 31. In this way, the first cam plate 222 is fixed to the crankcase 31. It should be noted that only one fastening member 210 is illustrated in FIGS. 3 and 6A. However, the number of the fastening members 210 is not particularly limited.

Figure 5A:
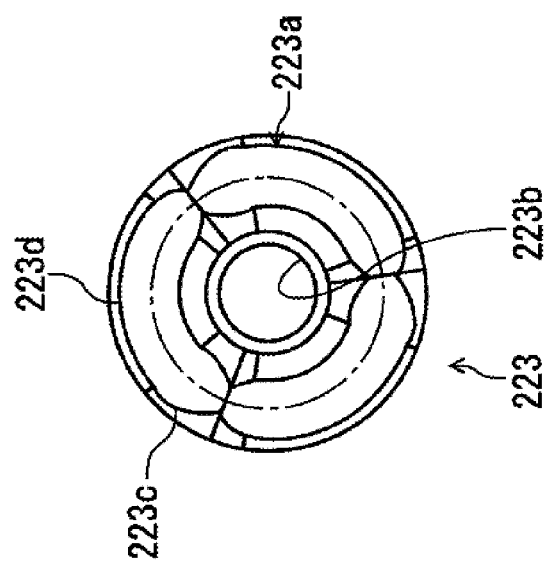

As illustrated in FIG. 5A, a through-hole 223b is formed in a central portion of the second cam plate 223. The slide shaft 231 is inserted through the through-hole 223b.

A stopper 225 is provided on the right end side of the second cam plate 223 and the slide shaft 231. The stopper 225 fixes the second cam plate 223 to the slide shaft 231, and allows the second cam plate 223 and the slide shaft 231 to rotate integrally and move integrally along the axial direction.

First cam grooves 222a are formed in the right side face of the first cam plate 222 (i.e., in the front-side face in FIG. 5C). An accommodation groove 222c is formed in one end portion of each of the first cam grooves 222a. Second cam grooves 223a are formed in the left side face of the second cam plate 223 (i.e., the front-side face in FIG. 5A). An accommodation groove 223c is formed in one end portion of each of the second cam grooves 223a. The accommodation grooves 222c and 223c have a groove depth (i.e., the width along the left-to-right direction in FIG. 3) greater than the other portions of the first cam groove 222a and the second cam groove 223a. The other portions having a groove depth less than that of the accommodation groove 222c are illustrated as travel grooves 222d in FIG. 5C. The other portions having a groove depth less than that of the accommodation groove 223c are illustrated as travel grooves 223d in FIG. 5A.

The first cam grooves 222a and the second cam grooves 223a are formed in such shapes that, when the second cam plate 223 rotates in a predetermined direction, the balls 224 roll up onto the travel grooves 222d and the travel grooves 223d from the accommodation grooves 222c and the accommodation grooves 223c, respectively, while when the second cam plate 223 rotates in the direction opposite to the predetermined direction, the balls 224 are put into the spaces between the accommodation grooves 222c and the accommodation grooves 223c. In other words, the two cam grooves 222a and 223a are formed so that, when the second cam plate 223 rotates in a predetermined direction, the two plates 222 and 223 are pressed by the balls 224 so as to be separated away from each other to cause the second cam plate 223 to move to the right. Also, the two cam grooves 222a and 223a are formed so that, when the second cam plate 223 rotates in the opposite direction, the second cam plate 223 moves to the left due to the urging force of the disc spring 83.

h. Sub Clutch

As illustrated in FIG. 3, the clutch 2 has the sub-clutch 130. As illustrated in FIG. 6A, the sub-clutch 130 includes a friction plate 131, a first pressing plate 132 that faces a left side surface 131a (hereafter referred to as the "first friction face") of the friction plate 131, and a second pressing plate 133 that faces a right side surface 131b (hereafter referred to as the "second friction face") of the friction plate 131.

The friction plate 131 has substantially a disk shape. The friction plate 131 is engaged with the pressure plate 77 so as to be rotated together with the pressure plate 77. A groove (not shown) is formed in a radially outside portion of the friction plate 131, and the slide arm portion 77c is slidably in engagement with the aforementioned groove of the friction plate 131.

A friction material is affixed to the first friction face 131a and the second friction face 131b of the friction plate 131. As will be described later, when the friction plate 131 is sandwiched between the first pressing plate 132 and the second pressing plate 133, the torque of the pressure plate 77 is transmitted to the first pressing plate 132 and the second pressing plate 133 via the friction plate 131.

The first pressing plate 132 has a pressing portion 132a extending radially and an arm portion 132b extending along the axial direction. The pressing portion 132a is arranged at a position that faces the first friction face 131a of the friction plate 131. The first pressing plate 132 has a pressure-contact face 132d on its right side. The pressure-contact face 132d is formed on the right side of the pressing portion 132a. The pressure-contact face 132d faces the first friction face 131a of the friction plate 131. A cam face 132c is formed in the side of the pressing portion 132a opposite to the friction plate 131. The cam face 132c is inclined with respect to the axial direction.

A circlip 134 is provided at the end side (the left side in FIG. 6A) of the arm portion 132b. The circlip 134 has substantially an annular shape. The circlip 134 is immovable along the axial direction with respect to the arm portion 132b. The circlip 134 restrains a flange portion 432 of the short push rod 43a from moving to the left relative to the first pressing plate 132.

The second pressing plate 133 is arranged on the side opposite to the first pressing plate 132 with respect to the friction plate 131. In other words, the second pressing plate 133 is arranged on the second friction face 131b side of the friction plate 131. At least a portion of the second pressing plate 133 is arranged so as to face the second friction face 131b of the friction plate 131. The second pressing plate 133 has a pressure-contact face 133d on its left side. The pressure-contact face 133d faces the second friction face 131b of the friction plate 131. The second pressing plate 133 has substantially an annular shape.

Here, the slide shaft 231 provided in the operation assist mechanism 220 is described in detail. The slide shaft 231 is arranged radially inward of the sub-clutch 130. The slide shaft 231 extends along the axial direction of the main shaft 33, and one end thereof is arranged to the right of the sub-clutch 130. The slide shaft 231 further has the extension portion 232. The extension portion 232 is a part that extends to substantially the same position as the pressing portion 132a of the first pressing plate 132. A hole 231b is formed in a radially inward portion of the extension portion 232. The hole 231b opens to the left and extends along the axial direction, and it has a bottom portion at an intermediate position along the axial direction of the slide shaft 231. In other words, the hole 231b does not penetrate the slide shaft 231 along the axial direction. The hole 231b accommodates a portion of the protruding portion 431. The short push rod 43a is slidable with respect to the slide shaft 231. However, the movement of the slide shaft 231 and the short push rod 43a along the axial direction is restrained by contact with the bottom portion of the slide shaft 231, or with the flange portion 432, a plurality of balls 135, the cam face 132c, and a cam face 231c.

The second pressing plate 133 is serration-fitted to the extension portion 232 of the slide shaft 231. Therefore, although the second pressing plate 133 rotates together with the slide shaft 231, it can move relative to the slide shaft 231 along the axial direction. The first pressing plate 132 is also serration-fitted to the extension portion 232 of the slide shaft 231. Therefore, although the first pressing plate 132 rotates together with the slide shaft 231, it can move relative to the slide shaft 231 along the axial direction. However, the first pressing plate 132 can be rotatable relative to the slide shaft 231 as long as it can move relative to the slide shaft 231 along the axial direction. For example, it can be configured such that the first pressing plate 132 has a through-hole in its radially inward portion and the slide shaft 231 passes through the through-hole. This enables the relative rotation of the slide shaft 231 and the first pressing plate 132.

The slide shaft 231 rotatably supports the pressure plate 77 via a bearing 104. This allows the relative rotation of the slide shaft 231 and the pressure plate 77. In addition, the slide shaft 231 and the pressure plate 77 are configured so as to move integrally along the axial direction.

The second pressing plate 133 moves together with the slide shaft 231 when the slide shaft 231 moves to the left. As illustrated in FIG. 6A, the slide shaft 231 has a boss portion 231d protruding radially outward. At least when the pressure plate 77 moves to the left, at least a portion of the left end face of the bearing 104 contacts the boss portion 231d. This allows the slide shaft 231 and the second pressing plate 133 to move to the left together with the pressure plate 77.

The cam face 231c is formed at one end of the slide shaft 231, i.e., the left end of the extension portion 232. The cam face 232c is inclined with respect to the axial direction.

The sub-clutch 130A is provided with a mechanism for transmitting a portion of the rightward force transmitted to the short push rod 43a to the first pressing plate 132 and the slide shaft 231. The plurality of balls 135 are provided between the cam face 132c and the cam face 231c and the flange portion 432 of the short push rod 43a. The number of the balls 135 is not particularly limited. As illustrated in FIG. 6B, the plurality of balls 135 are arranged along the circumferential direction centering on the axial center of the short push rod 43a and the flange portion 432. The plurality of balls 135 make relative movement with the flange portion 432, and the first pressing plate 132 and the slide shaft 231.

When the short push rod 43a moves to the right, the flange portion 432 presses the cam face 132c and the cam face 231c via the balls 135. At this time, the rightward force that have been transmitted to the short push rod 43a is transmitted to the first pressing plate 132 and the slide shaft 231 by the cam face 132c and the cam face 231c.

Figure 7:
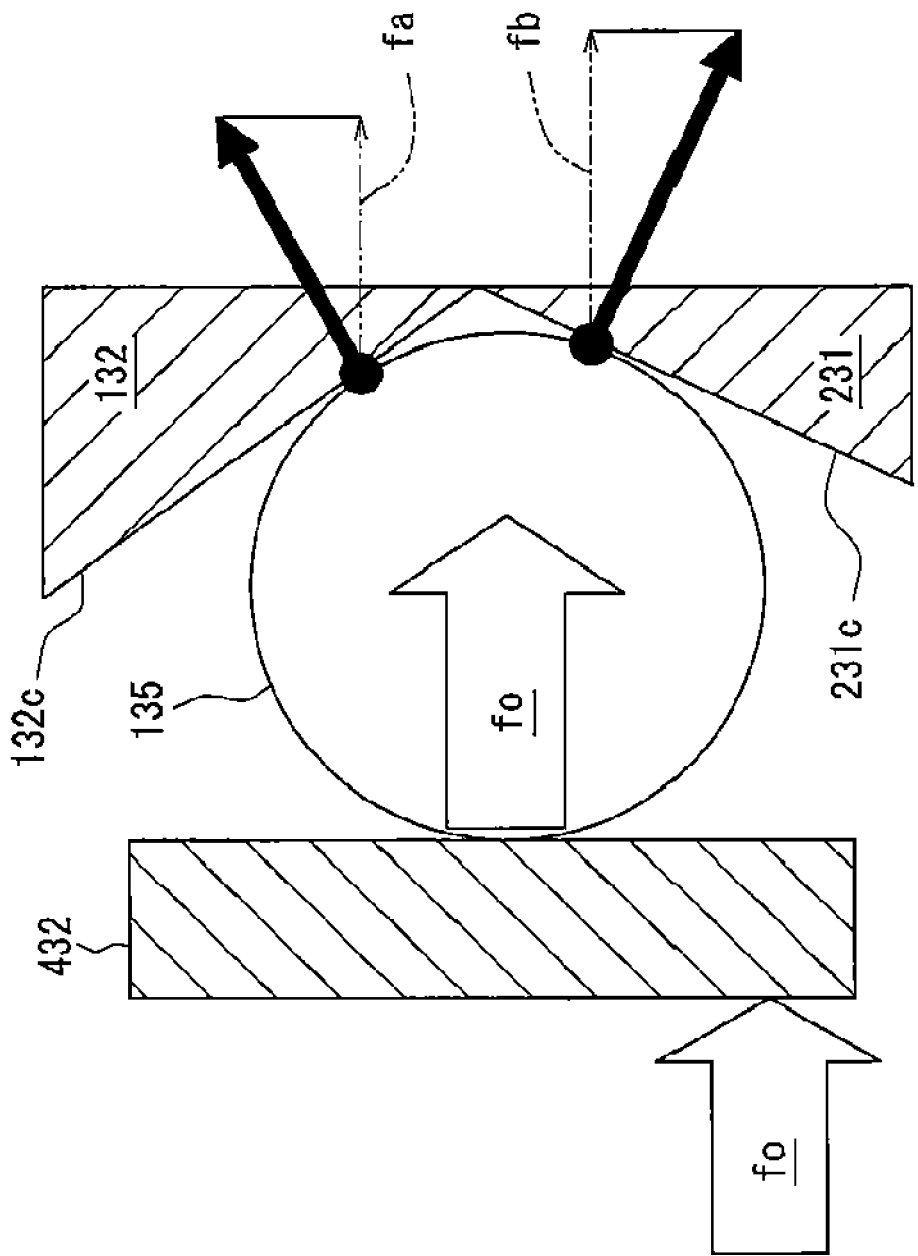
FIG. 7 is a view schematically illustrating a portion of the force of an operation input transmitted to a first pressing plate, and a portion of the force thereof transmitted to a slide shaft.

As illustrated in FIG. 7, it is assumed that the rightward force transmitted to the short push rod 43a is $f_0$. This force $f_0$ is referred to as an "operation input." The operation input $f_0$ is a force applied to the short push rod 43a in response to the operation of the clutch lever 24.

The balls 135 are pushed to the right with a force equal to the operation input $f_0$ by the flange portion 432 of the short push rod 43a. When the balls 135 are brought into contact with the cam face 132c and the cam face 231c, the operation input $f_0$ is divided and transmitted to the first pressing plate 132 and the slide shaft 231. The forces transmitted to the first pressing plate 132 and the slide shaft 231 are defined as a first pressing force $f_a$ and a second pressing force $f_b$, respectively. Here, the operation input $f_0$=the first pressing force $f_a$+the second pressing force $f_b$. The first pressing force $f_a$ is a force for moving the first pressing plate 132 to the right so as to bring the friction plate 131 and the second pressing plate 133 into pressure-contact with each other. The second pressing force $f_b$ is a force for moving the slide shaft 231 to the right.

As illustrated in FIGS. 6A and 7, the first pressing plate 132 moves to the right by receiving the first pressing force $f_a$. This allows the pressing portion 132a of the first pressing plate 132 to press the friction plate 131 against the second pressing plate 133, causing the friction plate 131 to be sandwiched between the pressing portion 132a and the second pressing plate 133. As a result, the first pressing plate 132, the friction plate 131, and the second pressing plate 133 move to the right along the axis of the slide shaft 231, bringing a portion of the right-side face of the second pressing plate 133 into contact with the bearing 104. Further, the short push rod 43a, the balls 135, the first pressing plate 132, the friction plate 131, and the second pressing plate 133 integrally move the pressure plate 77 to the right via the bearing 104. Thus, the pressure plate 77 moves to the right by receiving the first pressing force $f_a$.

When the friction plate 131 is sandwiched between the pressing portion 132a and the second pressing plate 133, a friction force is produced between the friction plate 131 and the first pressing plate 132 and between the friction plate 131 and the second pressing plate 133, so the torque of the pressure plate 77 is transmitted to the first pressing plate 132 and the second pressing plate 133 via the friction plate 131. The aforementioned torque is a force with a magnitude proportional to the first pressing force $f_a$. Upon receiving the torque, the slide shaft 231 rotates together with the first pressing plate 132 and the second pressing plate 133. In this way, a force with a magnitude proportional to the first pressing force $f_a$ is transmitted to the slide shaft 231.

The slide shaft 231 moves to the right by receiving the second pressing force $f_b$ or the first pressing force $f_a$. Because the second pressing plate 133 and the pressure plate 77 integrally move along the axial direction, the pressure plate 77 moves to the right when the first pressing force $f_a$ and the second pressing force $f_b$ are transmitted to the slide shaft 231. In other words, the first pressing force $f_a$ and the second pressing force $f_b$ act in a direction so as to cause the plate group 66 to separate from the pressure plate 77.

When the shapes or the inclined angles of the cam face 132c and the cam face 231c change, the ratio between the first pressing force $f_a$ and the second pressing force $f_b$ changes. Specifically, by changing the shapes or the inclined angles of the cam face 132c and the cam face 231c, it is possible to adjust the friction forces produced between the first pressing plate 132 and the friction plate 131 and between the friction plate 131 and the second pressing plate 133.

As described above, the through-hole 33a is formed inside the main shaft 33. The short push rod 43a, the ball 43c, and the long push rod 43b of the push mechanism 43 are inserted through the through-hole 33a. The gap space between the inner wall of the through-hole 33a and the long push rod 43b serves as an oil supply path for supplying oil to the clutch 2.

Further, in the short push rod 43a, an oil supply path 110 is formed that guides the oil within the aforementioned gap space to the sub-clutch 130. The oil supply path 110 comprises an oil introduction path (or oil introduction paths) 110a formed in a left-side part of the short push rod 43a, an oil passage 110b formed in a center portion of the short push rod 43a, and an oil discharge path (or oil discharge paths) 110c formed in a right-side part of the short push rod 43a. The oil introduction path 110a is a hole that extends radially, and it communicates with the oil passage 110b that extends along the axial direction. Likewise, the oil discharge path 110c is a hole that extends radially, and it communicates with the oil passage 110b. The outlet of the oil discharge path 110c, i.e., the radially outward opening of the oil discharge path 110c, opens toward the first friction face 131a and the second friction face 131b of the friction plate 131. Thereby, the oil within the oil supply path 110 is supplied toward the first friction face 131a and the second friction face 131b.

i. Operation of Clutch

Next, the operation of the clutch 2 according to this embodiment will be described below. First, the operation for disengaging the clutch 2 will be described.

When the rider grips the clutch lever 24 (see FIG. 1), the internal pressure of the operation chamber 92 (see FIG. 4) of the drive mechanism 87 increases. As a result, the piston 91 inside the cylinder 90 moves to the right against the urging force of the spring 93, and the long push rod 43b also moves to the right. Then, the ball 43c and the short push rod 43a accordingly move to the right, causing the flange portion 432 to press the cam face 132c and the cam face 231c via the plurality of balls 135. As a result, the first pressing plate 132 moves to the right. This allows the pressing portion 132a of the first pressing plate 132 to push the friction plate 131 against the second pressing plate 133 and causes the friction plate 131 to be sandwiched between the first pressing plate 132 and the second pressing plate 133, bringing the sub-clutch 130 into an engaged state. When the sub-clutch 130 enters an engaged state, the second pressing plate 133 rotates by receiving a torque from the friction plate 131.

Figure 8:
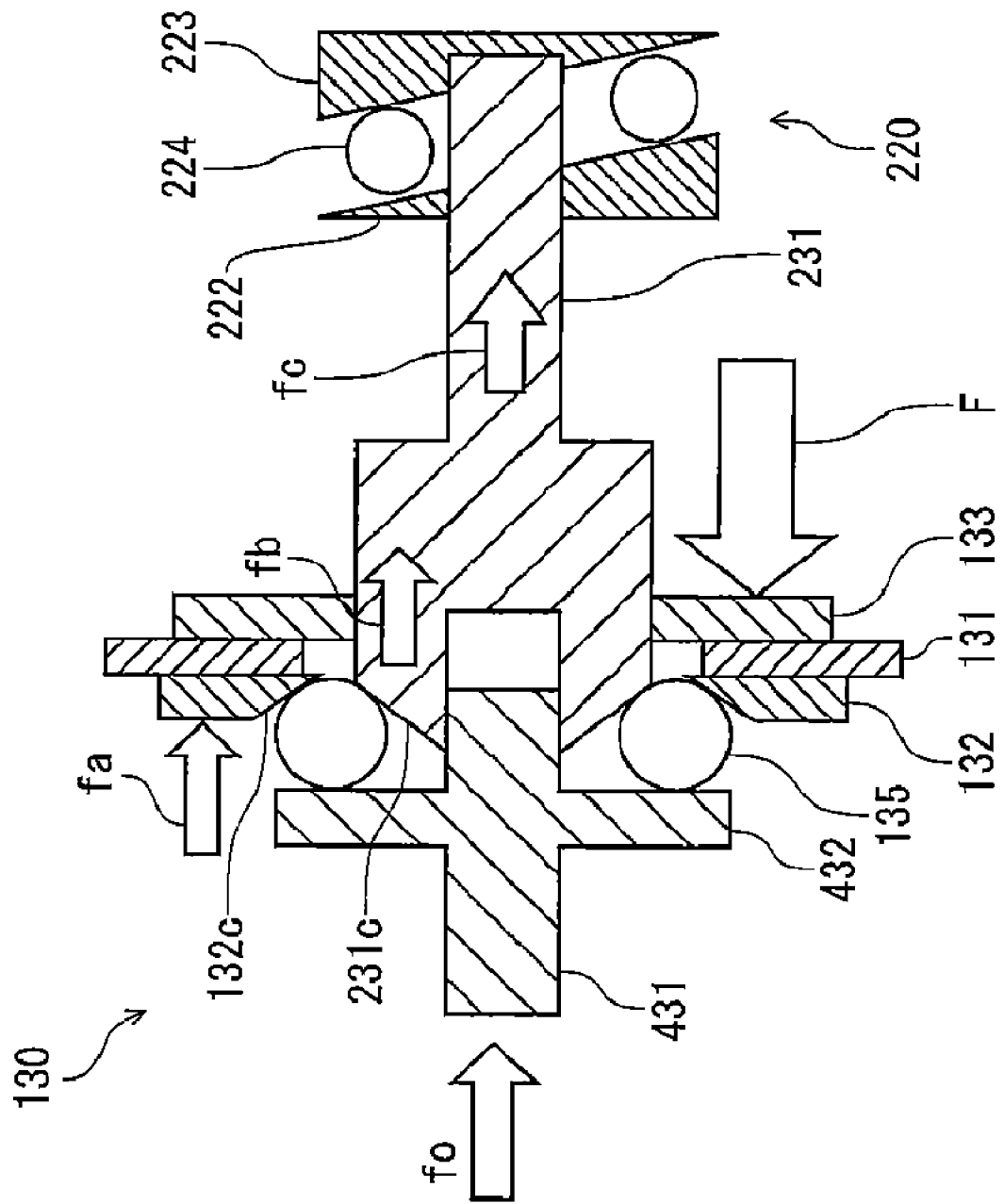
FIG. 8 is a view schematically illustrating the operation input, a portion of the force transmitted to the first pressing plate, a portion of the force transmitted to the slide shaft, and an assist force.

When the sub-clutch 130 enters an engaged state, the slide shaft 231 rotates at least together with the second pressing plate 133 in a predetermined direction, and the second cam plate 223 of the operation assist mechanism 220 also rotates in the same direction. Then, the three balls 224 roll up onto the travel grooves 222d and the travel grooves 223d from the accommodation grooves 222c and the accommodation grooves 223c, respectively, causing the second cam plate 223 to be pushed to the right by the balls 224. Thereby, the slide shaft 231 is also pushed to the right. In other words, by rotating in the predetermined direction, the slide shaft 231 causes the operation assist mechanism 220 to operate. When the operation assist mechanism 220 operates, a rightward force is applied to the slide shaft 231. This force is referred to as an "assist force $f_C$" (see FIG. 8). The assist force $f_C$ is a force that is converted from the torque of the slide shaft 231 into the rightward force.

As described above, the slide shaft 231 and the pressure plate 77 are capable of moving together along the axial direction. Therefore, the pressure plate 77 also receives the assist force $f_C$ as well as the first pressing force $f_a$ and the second pressing force $f_b$, and moves to the right.

When the pressure plate 77 moves to the right beyond a given amount, the pressing portion 77b separates from the plate group 66. As a result, the pressure-contact state of the plate group 66 is cancelled, resulting in the disengagement of the clutch 2.

The second cam plate 223 is restrained from rotating more than a given amount. For this reason, in the condition in which the clutch 2 is disengaged, the friction plate 131 rotates with respect to the first pressing plate 132 and the second pressing plate 133. In other words, the friction plate 131 slips with respect to the first pressing plate 132 and the second pressing plate 133. However, oil is supplied to the first friction face 131a and the second friction face 131b of the friction plate 131, so wear of the friction plate 131 is controlled.

Hereinafter, the operation for engaging the clutch 2 will be described.

To engage the clutch 2, the rider releases the clutch lever 24. Then, the internal pressure of the operation chamber 92 of the drive mechanism 87 decreases. This causes the leftward movement of the piston 91 and the long push rod 43b. Accordingly, the ball 43c and the short push rod 43a also move to the left. When the short push rod 43a moves to the left, the first pressing plate 132 engages with the circlip 134 and moves to the left. This causes the first pressing plate 132 to separate from the friction plate 131. The second pressing plate 133 is then no longer pushed rightward by the first pressing plate 132.

Moreover, since the rightward force produced by the first pressing plate 132 is cancelled, the pressure plate 77 is moved to the left by the urging force of the disc spring 83 or the like. As a result, the pressure plate 77 compresses the plate group 66, allowing the clutch 2 to be engaged. When the pressure plate 77 moves to the left, the second pressing plate 133 and the slide shaft 231 move to the left. When the second cam plate 223 and the slide shaft 231 move to the left, the second cam plate 223 rotates in the direction opposite to the above-mentioned predetermined direction. At this time, the plurality of balls 224 are put into the spaces between the accommodation grooves 222c and the accommodation grooves 223c from the travel grooves 222d and the travel grooves 223d. The friction plate 131 of the sub-clutch 130 separates from the second pressing plate 133.

As described above, the clutch 2 according to this embodiment allows one portion of the operation input $f_0$ to be transmitted to the slide shaft 231 via the friction plate 131 and the other portion to be transmitted to the slide shaft 231 without use of the friction plate 131, at the time when the short push rod 43a moves to the right. On the other hand, the operation assist mechanism 220 operates by the rotation of the slide shaft 231 in the aforementioned predetermined direction, to give the rightward force to the slide shaft 231. The slide shaft 231 moves to the right by receiving the force transmitted via the friction plate 131, the force transmitted without use of the friction plate 131, and the aforementioned rightward force.

The force necessary for disengaging the clutch 2 is a force that exceeds the urging force or the like of the disc spring 83. The force necessary for disengaging the clutch 2 is referred to as an "operating force F" (see FIG. 8). The operation force F has a constant value for each clutch 2. The operation force F varies depending on the disc spring 83. In other words, the operating force F is a force corresponding to the transmission torque of the clutch 2, i.e., a force corresponding to the performance or the like. The clutch 2 is disengaged by a resultant force of the first pressing force $f_a$, the second pressing force $f_b$, and the assist force $f_C$. Therefore, the following Equation (1) is established between the operating force F, the first pressing force $f_a$, the second pressing force $f_b$, and the assist force $f_C$.

$$F=f_a+f_b+f_C \quad (1)$$

As described above, the torque of the slide shaft 231 and the second pressing plate 133 is a force with a magnitude proportional to the first pressing force $f_a$. The assist force $f_C$ is a force obtained by converting the aforementioned torque of the slide shaft 231 into a rightward force. Therefore, the following Equation (2) is established between the assist force $f_C$ and the first pressing force $f_a$.

$$f_C=C \cdot f_a \quad (2)$$

In Equation (2), C is the proportion of the assist force $f_C$ with respect to the first pressing force $f_a$, which is referred to as a "conversion rate." Therefore, the operating force F can be expressed by the following Equation (3).

$$F=f_a+f_b+C \cdot f_a=f_b+(1+C) \cdot f_a \quad (3)$$

The first pressing force $f_a$ is a force transmitted to the slide shaft 231 via the friction plate 131 and the second pressing plate 133. The second pressing force $f_b$ is a force transmitted to the slide shaft 231 without use of the friction plate 131.

As can be understood from Equation (3), even if the conversion rate C is decreased, the relation: the operating force F=constant can be maintained without making the first pressing force $f_a$ so large as long as the second pressing force $f_b$ is increased. In addition, even when the first pressing force $f_a$ is small, the relation: the operating force F=constant can be maintained by increasing the second pressing force $f_b$. As a result, the friction force of the friction plate 131 or the like produced at the time of engaging the sub-clutch 130 can be kept small. Thereby, even if the friction plate 131 is not increased in size, there is no risk of degrading the durability of the sub-clutch 130. In other words, the assist force $f_C$ of the operation assist mechanism 220 can be reduced without increasing the size of the friction plate 131 or the like of the sub-clutch 130. Therefore, the clutch 2 according the present embodiment makes it possible to reduce the assist force $f_C$, while maintaining the durability of the friction plate 131 and preventing the friction plate from increasing in size.

In this embodiment, when the first pressing plate 132 moves to the right in association with the rightward movement of the short push rod 43a, the balls 135 come into contact with the short push rod 43a, the first pressing plate 132, and the slide shaft 231, transmitting the force to the first pressing plate 132 and the slide shaft 231. Thereby, a portion of the operation input $f_0$ is transmitted to the first pressing plate 132, and the other portion is transmitted to the slide shaft 231. The one portion of the operation input $f_0$ is transmitted to the slide shaft 231 via the friction plate 131.

In the spaces between the flange portion 432 of the short push rod 43a, the cam face 231c of the extension portion 232 of the slide shaft 231, and the cam face 132c of the first pressing plate 132, the plurality of balls 135 are arranged along the circumferential direction centering on the axial center of the short push rod 43a. The operation input $f_0$ is transmitted to the first pressing plate 132 and the slide shaft 231 via the balls 135, the cam face 132c, and the cam face 231c. The ratio between the first pressing force $f_a$ and the second pressing force $f_b$ can be adjusted easily by changing the shapes or the inclined angles of the cam face 132c and the cam face 231c. In this embodiment, the friction forces produced between the first pressing plate 132 and the friction plate 131 and between the friction plate 131 and the second pressing plate 133 can be easily adjusted depending on, e.g., the application or performance of the clutch 2.

The first pressing plate 132 is attached to the extension portion 232 of the slide shaft 231 so as to rotate with the slide shaft 231. As described above, the torque of the pressure plate 77 is transmitted to the second pressing plate 133 via the friction plate 131 at the time of engaging the sub-clutch 130. The second pressing plate 133 rotates together with the slide shaft 231. In other words, the torque of the pressure plate 77 is transmitted to the slide shaft 231 via the first pressing plate 132 and the second pressing plate 133 at the time of engaging the sub-clutch 130. Therefore, the clutch 2 according to this embodiment achieves two times the torque of the pressure plate 77 transmitted to the sub-clutch 130 that in the case where the torque of the pressure plate 77 is transmitted to the slide shaft 231 only from the second pressing plate 133. As a result, the torque of the pressure plate 77 transmitted to the sub-clutch 130 can be increased without increasing the diameters of the friction plate 131 and the second pressing plate 133.

As described above, the clutch 2 according to this embodiment can maintain the durability of the friction plate 131 and inhibit the friction plate 131 from increasing in size. Because the friction plate 131 is inhibited from increasing in size, relatively sufficient space for mounting the clutch 2 in the vehicle is ensured when the clutch 2 is equipped on the vehicle. Moreover, since the durability of the friction plate 131 is maintained, the durability of the structural components of the vehicle coupled to the clutch 2 can improve. Furthermore, the clutch 2 can reduce the assist force $f_C$ of the operation assist mechanism 220. Therefore, the operability of the clutch lever 24 can be kept desirably. Specifically, if the conversion rate C or the assist force $f_C$ becomes greater, the operation of the clutch lever 24 will be lighter correspondingly. Therefore, when the clutch 2 is equipped on the motorcycle 1 and the conversion rate C or the assist force $f_c$ of the operation assist mechanism 220 is large, the operability of the clutch lever 24 may deteriorate. However, the clutch 2 according to this embodiment makes it possible to reduce the assist force $f_C$ of the operation assist mechanism 220. Therefore, the rider's operability of the clutch lever 24 can be kept desirably.

Modified Embodiment 1

The transmission member is not limited to the balls 135. Hereinafter, a clutch 2 of Modified Embodiment 1 will be described. In this modified embodiment, the transmission member is constituted by a spring mechanism 310.

Figure 9:
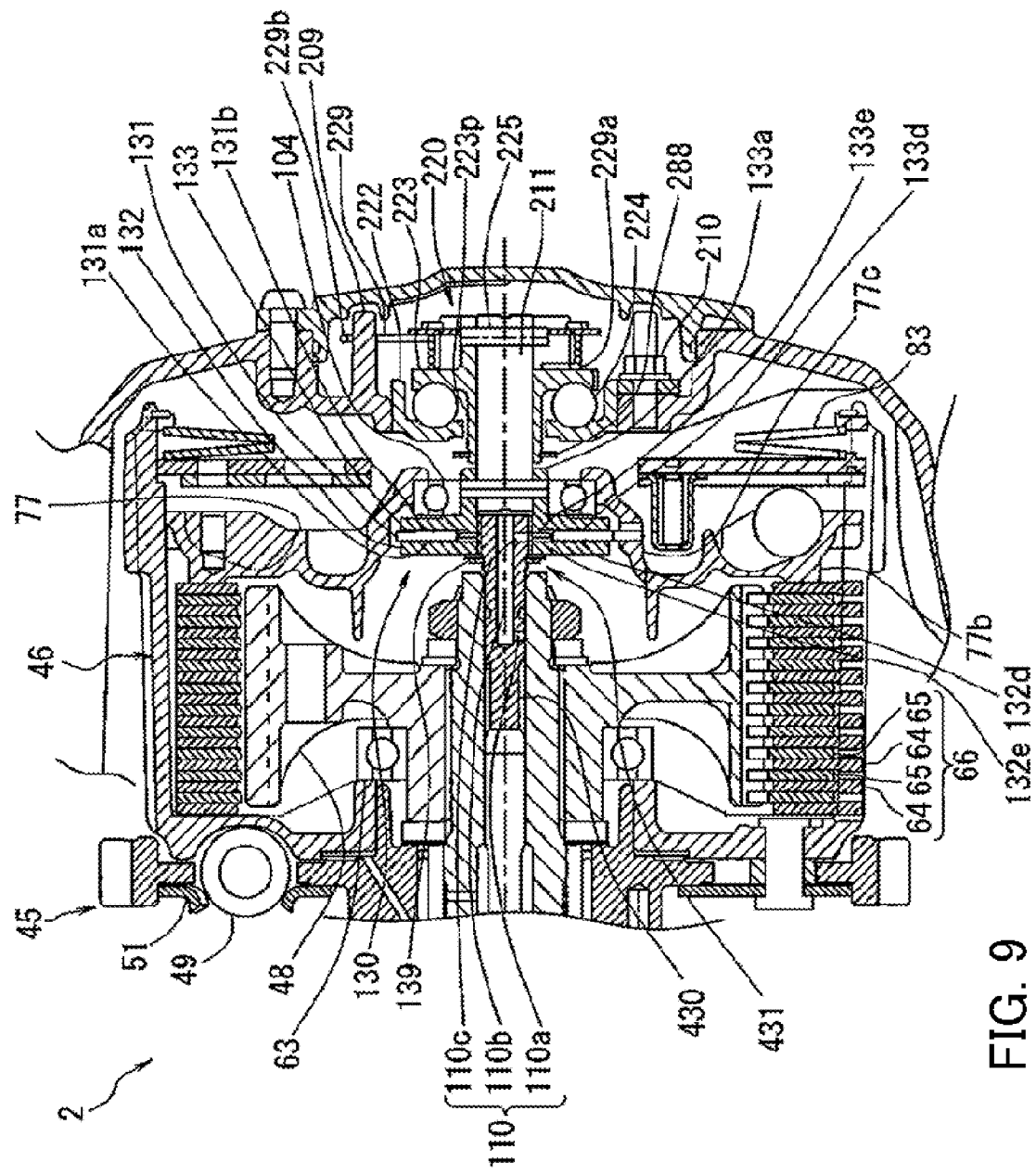
FIG. 9 is a cross-sectional view illustrating a clutch according to a modified embodiment 1.

As illustrated in FIG. 9, the clutch 2 is provided with a push rod 430. The push rod 430 is accommodated in the through-hole 33a (see FIG. 4) of the main shaft 33. The right end portion of the push rod 430 protrudes from the main shaft 33.

a. Operation Assist Mechanism

The operation assist mechanism 220 has a slide shaft 211 and a coil spring 229. A stopper 225 is provided on the right end side of the second cam plate 223 and the slide shaft 211. The second cam plate 223 is fixed to the slide shaft 211 by the stopper 225. The second cam plate 223 and the slide shaft 211 rotate integrally, and they also move integrally along the axial direction.

One end 229a of the coil spring 229 is locked to the second cam plate 223. The other end 229b of the coil spring 229 is locked to a pin 209 fixed to the crankcase 31. From the coil spring 229, the second cam plate 223 receives a torque with which it is rotated around the slide shaft 211. The second cam plate 223 receives a force toward the first cam plate 222 side by the urging force of the disc spring 83 and the coil spring 229.

A stopper 288 is provided on the left end portion of the cylindrical portion 223p of the second cam plate 223. At least the slide shaft 211 and the second cam plate 223 are restrained from movement to the right with respect to the first cam plate 222 by the stopper 288. In this modified embodiment, the slide shaft 211, the second cam plate 223, the second pressing plate 133, and the pressure plate 77 move together along the axial direction. Therefore, the slide shaft 211, the second cam plate 223, the second pressing plate 133, and the pressure plate 77 move integrally to the right until the stopper 288 and the first cam plate 222 come in contact with each other.

b. Sub Clutch

A pressure-contact face 132d and a spring contact face 132e are provided on the right side of the first pressing plate 132. The pressure-contact face 132d faces the first friction face 131a of the friction plate 131. The spring contact face 132e is located radially inward of the pressure-contact face 132d. The spring contact face 132e faces the later-described spring mechanism 310 (see FIG. 10).

The first pressing plate 132 is serration-fitted to a push rod 430. Therefore, the first pressing plate 132 rotates together with the push rod 430. The first pressing plate 132 is movable relative to the push rod 430 along the axial direction. A stopper 139 is provided to the left of the first pressing plate 132. The stopper 139 is fixed to the push rod 430. The first pressing plate 132 is restrained from moving to the left relative to the push rod 430 by the stopper 139.

A pressure-contact face 133d and a spring contact face 133e are formed on the left side of the second pressing plate 133. The pressure-contact face 133d faces the second friction face 131b of the friction plate 131. The spring contact face 133e is located radially inward of the pressure-contact face 133d. The spring contact face 133e faces the spring mechanism 310 (see FIG. 10).

The second pressing plate 133 is serration-fitted to the push rod 430. Therefore, although the second pressing plate 133 rotates together with the push rod 430, it can move relative to the slide shaft 430 along the axial direction. The second pressing plate 133 has a boss portion 133a that extends to the right. The boss portion 133a rotatably supports the pressure plate 77 via the bearing 104. This allows the second pressing plate 133 and the pressure plate 77 to rotate relative to each other. The second pressing plate 133 and the pressure plate 77 are configured to move integrally along the axial direction. The slide shaft 211 is attached to the boss portion 133a.

Figure 10:
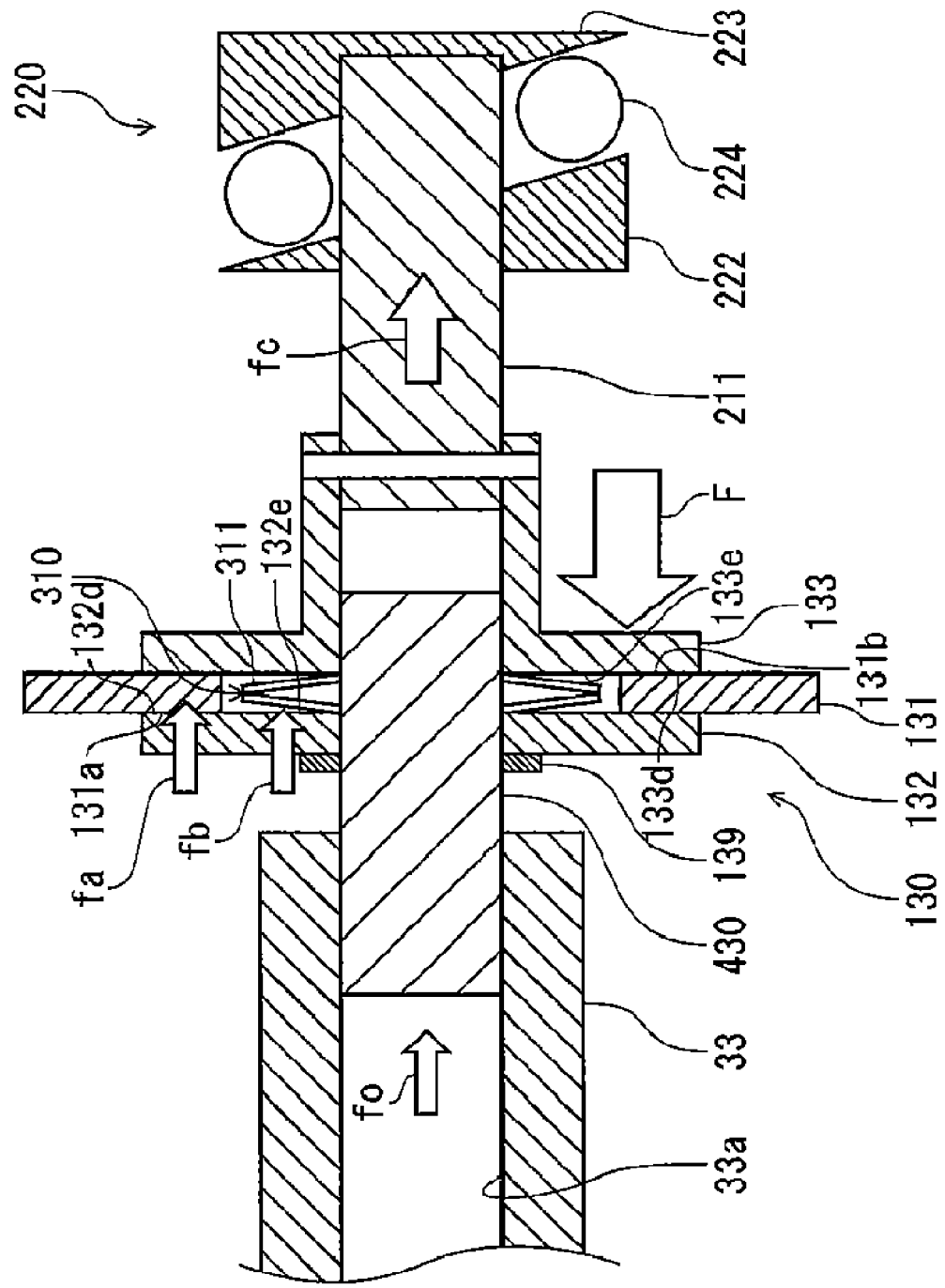
FIG. 10 is a view schematically illustrating a portion of the force transmitted to the first pressing plate, a portion of the force transmitted to the slide shaft, and the assist force in the clutch according to the modified embodiment 1.

As illustrated in FIG. 10, a spring mechanism 310 is provided between the first pressing plate 132 and the second pressing plate 133. The spring mechanism 310 urges the first pressing plate 132 from the right to the left. The spring mechanism 310 is formed by a leaf spring 311. The leaf spring 311 is arranged radially inward of the friction plate 131.

As illustrated in FIG. 10, the operation input $f_0$ is divided into the first pressing force $f_a$ and the second pressing force $f_b$. The first pressing force $f_a$ is a force transmitted from the push rod 430 to the slide shaft 211 via the friction plate 131 and the second pressing plate 133. The second pressing force $f_b$ is a force transmitted from the push rod 430 to the slide shaft 211 via the spring mechanism 310 and the second pressing plate 133 without use of the friction plate 131.

When the push rod 430 moves to the right, the stopper 139 presses the first pressing plate 132. Then, the first pressing plate 132 moves to the right. The first pressing plate 132 first presses the leaf spring 311 to compress the leaf spring 311. After the leaf spring 311 is compressed, the first pressing plate 132 comes into contact with the friction plate 131, pressing the friction plate 131 toward the second pressing plate 133 side. As a result, the friction plate 131 is sandwiched between the first pressing plate 132 and the second pressing plate 133. Thereby, the sub-clutch 130 enters an engaged state. Also, the torque of the pressure plate 77 is transmitted to the first pressing plate 132 and the second pressing plate 133 via the friction plate 131. Thereby, a torque is applied to the first pressing plate 132 and the second pressing plate 133. Upon receiving the torque, the slide shaft 211 rotates together with the first pressing plate 132 and the second pressing plate 133.

The second pressing plate 133 receives the second pressing force $f_b$ from the leaf spring 311 and the first pressing force $f_a$ from the friction plate 131, and consequently moves to the right. When the first pressing force $f_a$ and the second pressing force $f_b$ are transmitted to the slide shaft 211, the pressure plate 77 moves to the right.

In this modified embodiment, it is also possible to reduce the assist force $f_C$ while maintaining the durability of the friction plate 131 and inhibiting the friction plate 131 from increasing in size.

In this modified embodiment, the spring mechanism 310 is constituted by the leaf spring 311. The leaf spring 311 is smaller in size along the axial direction (along the right-to-left direction in FIG. 10) than the coil spring. This makes it possible to make effective use of the space between the first pressing plate 132 and the second pressing plate 133. In other words, the sub-clutch 130 does not have an unnecessarily large volume with respect to the axial direction. Therefore, the sub-clutch 130 does not become too large, inhibiting the clutch 2 from increasing in size.

Furthermore, in this modified embodiment, the leaf spring 311 is arranged radially inward of the friction plate 131. In other words, the sub-clutch 130 does not have an unnecessarily large volume in its radially outward portion. Therefore, the sub-clutch 130 does not become too large, inhibiting the clutch 2 from increasing in size.

Modified Embodiment 2

Figure 11:
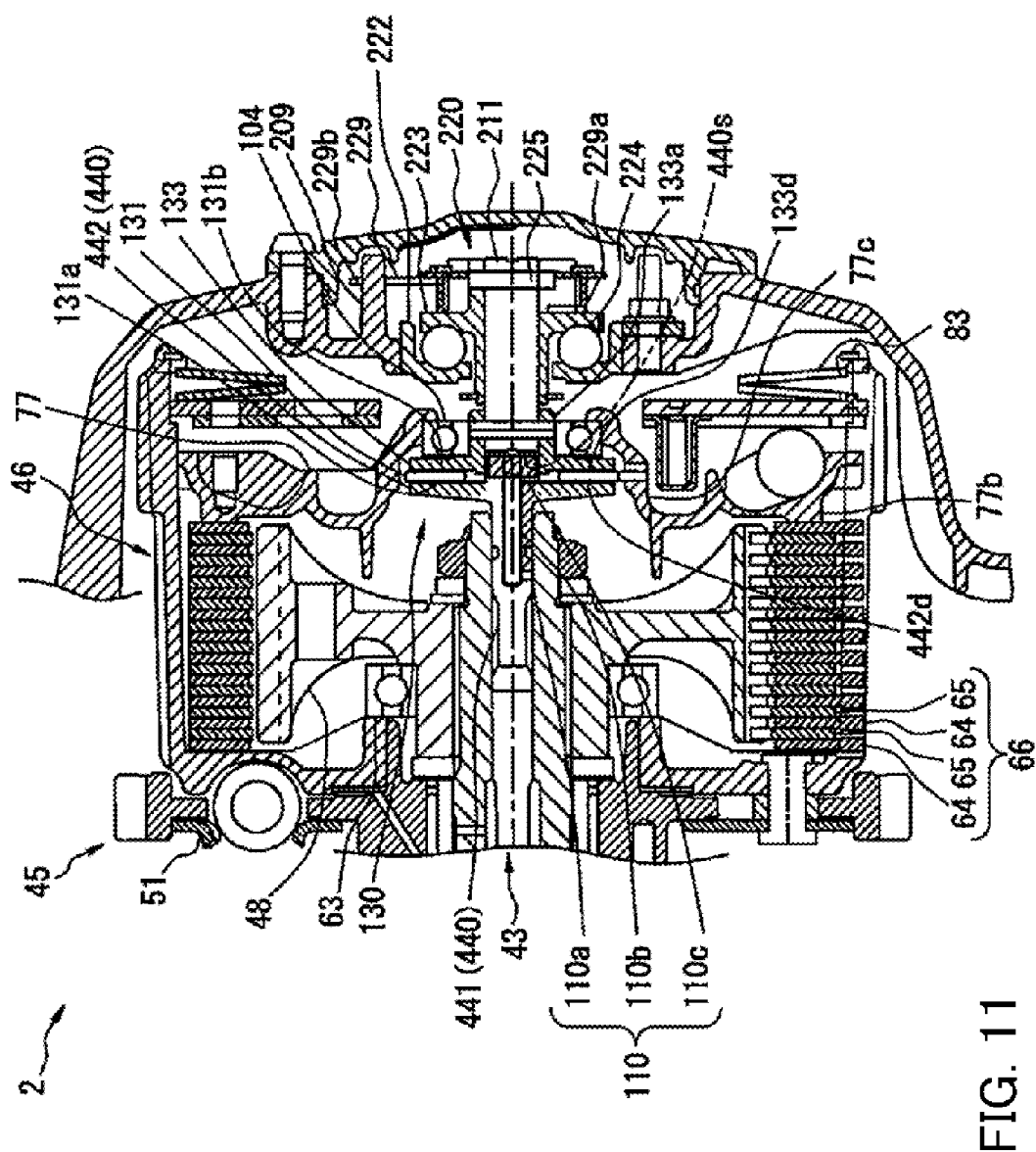
FIG. 11 is a cross-sectional view illustrating a clutch according to a modified embodiment 2.

As illustrated in FIG. 11, in this modified embodiment, the transmission member is constituted by a serration 440s formed on a push rod 440.

Figure 12:
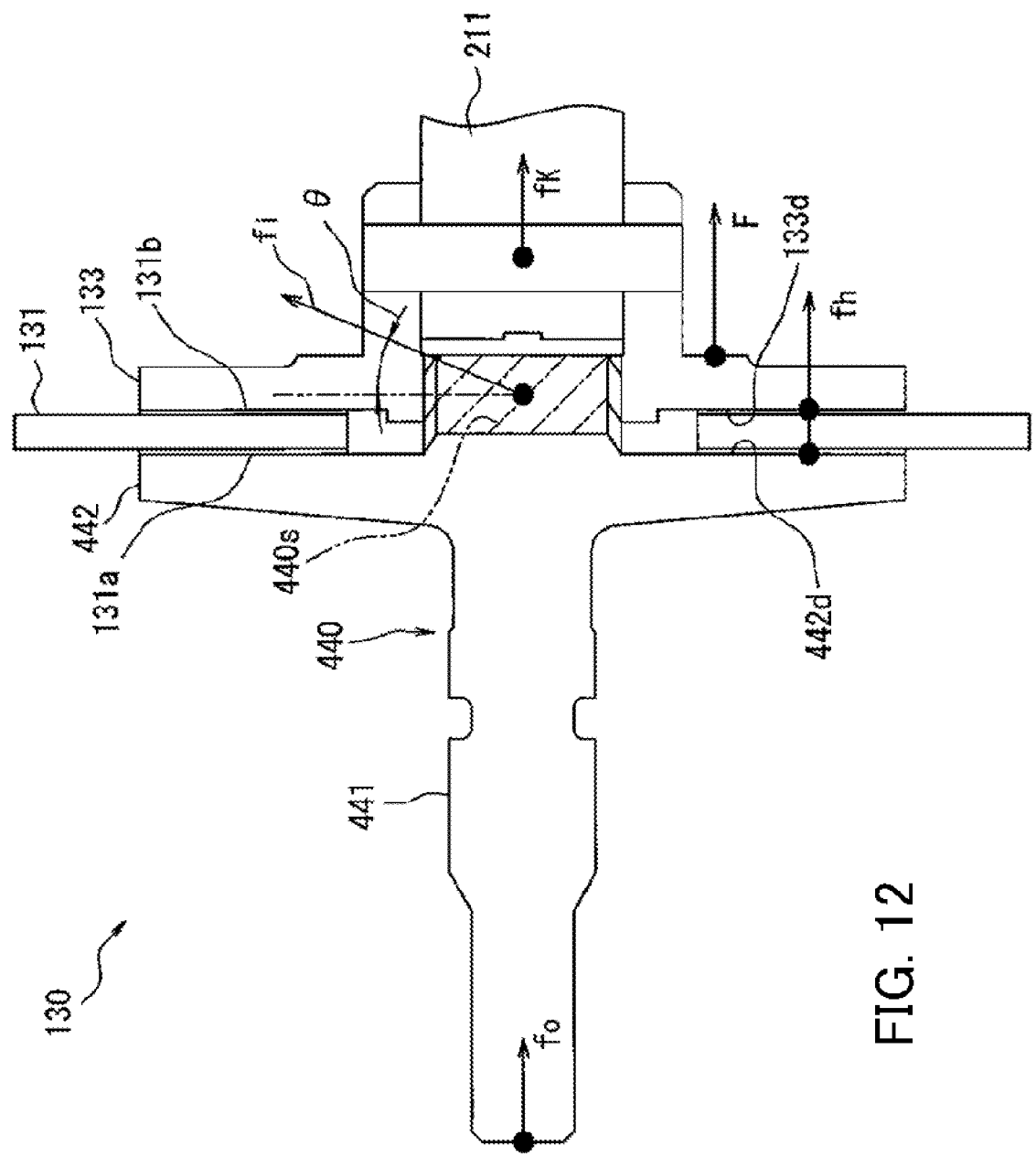
FIG. 12 is a view schematically illustrating a portion of the force transmitted to the first pressing plate, a portion of the force transmitted to the slide shaft, and the assist force in the clutch according to the modified embodiment 2.

The push rod 440 is a member in which a pressing member for pressing the friction plate 131 to the right and an operating shaft for moving the pressing member to the right are integrated with each other. The push rod 440 has a plate portion 442 serving as the pressing member, and a rod portion 441 serving as the operating shaft. The push rod 440 forms a portion of the push mechanism 43 as well as a portion of the sub-clutch 130. The plate portion 442 is extended from the rod portion 441 in a flange shape radially outward of the rod portion 441. The plate portion 442 has a pressure-contact face 442d on the right side thereof. The pressure-contact face 442d faces the first friction face 131a of the friction plate 131. As illustrated in FIG. 12, the serration 440s is provided on a right end portion of the push rod 440. The serration 440s is formed rightward of the plate portion 442 in such a manner that it inclines from the axial direction of the rod portion 441. The second pressing plate 133 is engaged with the rod portion 441 via the serration 440s. The second pressing plate 133 rotates together with the push rod 440 and is movable along the axial direction relative to the push rod 440.

As illustrated in FIG. 12, when the push rod 440 moves to the right, the operation input $f_0$ is divided into at least two forces. One of the forces is a force $f_h$ with which the plate portion 442 presses the friction plate 131, and the other force is a force $f_i$ transmitted to the second pressing plate 133 from the serration 440s.

Assuming that the inclined angle of the serration 440s is θ, the force transmitted from the serration 440s to the second pressing plate 133 along the axial direction (hereafter referred to as a "second pressing force") will be $f_i \cdot \sin \theta$. The following Equation (4) holds for the operation input $f_0$, the force $f_h$ transmitted from the friction plate 131 to the second pressing plate 133 (hereafter referred to as a "first pressing force"), and the second pressing force $f_i \cdot \sin \theta$.

$$f_0 = f_h + f_i \cdot \sin \theta \quad (4)$$

When the plate portion 422 pushes the friction plate 131 toward the second pressing plate 133 side, the friction plate 131 is sandwiched between the plate portion 442 and the second pressing plate 133. Thereby, the sub-clutch 130 enters an engaged state. Also, the torque of the pressure plate 77 is transmitted to the push rod 440 and the second pressing plate 133 via the friction plate 131. Thereby, a torque is applied to the plate portion 442 and the second pressing plate 133. The aforementioned torque is a force with a magnitude proportional to the first pressing force $f_h$.

On the other hand, a torque is applied to the second pressing plate 133 also from the serration 440s. This torque is a force with a magnitude proportional to the force $f_i$, and can be expressed by the following Equation (5).

$$T_S = f_i \cdot \cos \theta \times r_S \quad (5)$$

In the equation, $r_S$ is the effective diameter of the serration 440s. Since the slide shaft 211 and the second pressing plate 133 are fixed, the torque $T_s$ is transmitted also to the slide shaft 211. Upon receiving the torques, the slide shaft 211 rotates together with the plate portion 442 and the second pressing plate 133. In other words, the aforementioned torque with a magnitude proportional to the first pressing force $f_h$ and the torque $T_S$ with a magnitude proportional to the force $f_i$ are transmitted to the slide shaft 211.

Here, when the push rod 440 is not rotating, the following Equation (6) holds between the torque with a magnitude proportional to the first pressing force $f_h$ and the torque $T_S$ with a magnitude proportional to the force $f_i$.

$$f_i \cdot \cos \theta \times r_S = \mu f_h \times r_P = T_S \quad (6)$$

In Equation (6), $r_P$ is the effective friction radius of the sub-clutch 130, and μ is the coefficient of friction of the sub-clutch 130. As indicated by Equation (6), the torque $T_S$ is, after all, expressed as a function of the torque with a magnitude proportional to the first pressing force $f_h$.

When the push rod 440 moves to the right, the second pressing plate 133 receives the first pressing force $f_h$ from the pressure-contact face 133d. The second pressing plate 133 receives the second pressing force $f_i \cdot \sin \theta$ from the serration 440s in an axial direction, and receives the torque $T_s$ in a circumferential direction. Therefore, the second pressing plate 133 moves to the right while rotating in a predetermined direction.

When the sub-clutch 130 enters an engaged state, the slide shaft 211 rotates in the aforementioned predetermined direction together with the second pressing plate 133. The slide shaft 211 rotates in the predetermined direction and thereby makes the operation assist mechanism 220 operate. When the operation assist mechanism 220 operates, a rightward force is applied to the slide shaft 211. This force is referred to as an "assist force $f_K$." The assist force $f_K$ is a force obtained by converting the torque of the slide shaft 211 in the predetermined direction into the rightward force.

In the clutch 2, the following Equation (7) holds.

$$F = f_h + f_i \cdot \sin \theta + f_K \quad (7)$$

In addition, the following Equation (8) holds between the assist force $f_K$ and the first pressing force $f_h$.

$$f_K = K \cdot f_h \quad (8)$$

In the equation, K is the conversion rate, which is the proportion of the assist force $f_K$ with respect to the first pressing force $f_h$. Then, the operating force F can be expressed by the following Equation (9).

$$F = f_i \cdot \sin \theta + (1+K) \cdot f_h \quad (9)$$

As indicated by Equation (9), even in cases where the first pressing force $f_h$ is small, it is sufficient to increase the second pressing force $f_i \cdot \sin \theta$. Therefore, the clutch 2 according this embodiment also makes it possible to reduce the assist force $f_K$, while maintaining the durability of the friction plate 131 and preventing the friction plate 131 from increasing in size.

Other Modified Embodiments

In the aforementioned embodiment and each of the modified embodiments described above, the operation input $f_0$ is divided into the first pressing force and the second pressing force in the sub-clutch 130. However, the operation input $f_0$ can be divided at other locations other than the sub-clutch 130. The clutch 2 can be provided with a mechanism for transmitting a portion of the operation input $f_0$ to the pressure plate 77 without use of the friction plate 131. This mechanism transmits one portion of the operation input $f_o$ to the first pressing plate 132 (see FIG. 6), and transmits the other portion of the operation input $f_o$ to the pressure plate 77. In Modified Embodiments, the pressure plate 77 and the slide shaft 211 can move to the right together. Therefore, the other portion of the operation input $f_o$ is transmitted to the slide shaft 211 via the pressure plate 77.

In the aforementioned embodiment and Modified Embodiment 1 described above, the short push rod 43a and the push rod 430 are configured so as to be pushed out to the right by the clutch release mechanism 86. However, the short push rod 43a or the push rod 430 can be pulled to the right by another clutch release mechanism provided rightward of the operation assist mechanism 220. For example, the slide shaft 231 or the slide shaft 211 can be formed in a hollow shape, and it can be configured to pull the short push rod 43a or the push rod 430 to the right by a mechanism provided in the interior of the slide shaft 231 or the slide shaft 211.

BROAD SCOPE OF THE INVENTION

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein. While illustrative embodiments of the invention have been described herein, the present invention is not limited to the various preferred embodiments described herein, but includes any and all embodiments having equivalent air filter elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" is meant as a non-specific, general reference and may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example."

What is claimed is:

1. A friction clutch comprising:
a clutch shaft;
a driving-side rotating member having a first plate and rotating centered around an axial center of the clutch shaft;
a driven-side rotating member having a second plate facing the first plate;
a pressure plate coupled to the driving-side rotating member so as to rotate together with the driving-side rotating member, wherein the pressure plate is configured to move in a first direction that is a direction from one side of an axial direction of the clutch shaft to the other side thereof to bring the first plate and the second plate into contact with each other;
a clutch operator;
an operating shaft configured to move in a second direction by receiving a force in a direction opposite to the first direction when the clutch operator is operated;
a sub-clutch having a friction plate, a pressing member, and a torque transmission member, the pressing member and the torque transmission member sandwiching the friction plate therebetween, wherein the friction plate has a first friction face on the other side thereof and a second friction face on the one side thereof, and is coupled to the pressure plate so as to rotate together with the pressure plate, wherein the pressing member is arranged so as to face the first friction face and is configured to move in the second direction together with the operating shaft and to contact with the first friction face to press the friction plate in the second direction, and wherein the torque transmission member is arranged so as to face the second friction face and is configured to receive the torque of the pressure plate via the friction plate by being pressure-contacted by the friction plate pressed by the pressing member;
a slide shaft coupled to the torque transmission member such as to be rotated together with the torque transmission member and also coupled to the pressure plate such as to move along the axial direction together with the pressure plate, wherein the slide shaft is configured to give a force in the second direction to the pressure plate by receiving a torque from the torque transmission member and moving in the second direction; and
a transmission member for transmitting, to the slide shaft, a portion of the force in the second direction applied to the operating shaft without use of the friction plate when the operating shaft moves in the second direction.

2. The friction clutch according to claim 1, wherein, when the pressing member moves in the second direction in association with the movement of the operating shaft in the second direction, the transmission member makes contact with the operating shaft, the pressing member, and the slide shaft to transmit the force in the second direction to the pressing member and the slide shaft.

3. The friction clutch according to claim 2,
wherein the slide shaft has an extension portion, one end of which being located closer to the one side than the sub-clutch, the extension portion being arranged radially inward of the sub-clutch and extending along the axial direction to the other side to substantially the same position as the pressing member, wherein the extension portion has a cam face located on the one side of the transmission member and inclined with respect to the axial direction, wherein the pressing member has a cam face located on the one side of the transmission member and inclined with respect to the axial direction;

wherein the operating shaft has a flange portion located closer to the other side than the extension portion and protruding radially outward, and wherein the force transmitting member comprises a plurality of balls arranged between the cam face of the flange portion and the extension portion and the cam face of the pressing member, and along the circumferential direction centering on the axial center of the operating shaft.

4. The friction clutch according to claim 3, wherein the pressing member is attached to the extension portion so as to rotate together with the slide shaft.

5. The friction clutch according to claim 1,
wherein the slide shaft is configured to move in the second direction together with the torque transmission member, and
wherein the transmission member is a spring mechanism provided between the pressing member and the torque transmission member along the axial direction, the spring mechanism being configured to urge the pressing member) in the first direction so as to transmit a portion of the force in the second direction applied to the operating shaft, from the pressing member via the torque transmission member to the slide shaft.

6. The friction clutch according to claim 5, wherein the spring mechanism is formed by a leaf spring.

7. The friction clutch according to claim 6, wherein the leaf spring is located radially inward of the friction plate with respect to a radial direction of the clutch shaft.

8. The friction clutch according to claim 1,
wherein serration inclined with respect to the axial direction of the operating shaft is formed on an outer peripheral surface of the operating shaft,
wherein the torque transmission member and the operating shaft mesh with each other by the serration,
wherein the pressing member is movable in the second direction with the operating shaft,
wherein the slide shaft is fixed to the torque transmission member, and
wherein the serration transmits, to the torque transmission member, a portion of the force in the second direction applied to the operating shaft when the operating shaft moves in the second direction.

9. The friction clutch according to claim 1, wherein the clutch operator is a clutch lever provided on a handle bar of a motorcycle.

10. A vehicle equipped with a friction clutch,
wherein the friction clutch comprises:
a clutch shaft;
a driving-side rotating member having a first plate and rotating centered around an axial center of the clutch shaft;
a driven-side rotating member having a second plate facing the first plate;
a pressure plate coupled to the driving-side rotating member so as to rotate together with the driving-side rotating member, wherein the pressure plate is configured to move in a first direction that is a direction from one side of an axial direction of the clutch shaft to the other side thereof to bring the first plate and the second plate into contact with each other;
a clutch operator;
an operating shaft configured to move in a second direction by receiving a force in a direction opposite to the first direction when the clutch operator is operated;
a sub-clutch having a friction plate, a pressing member, and a torque transmission member, the pressing member and the torque transmission member sandwiching the friction plate therebetween, wherein the friction plate has a first friction face on the other side thereof and a second friction face on the one side thereof, and is coupled to the pressure plate such as to rotate together with the pressure plate, wherein the pressing member is arranged so as to face the first friction face and is configured to move in the second direction together with the operating shaft and to contact with the first friction face to press the friction plate in the second direction, and wherein the torque transmission member is arranged such as to face the second friction face and configured to receive the torque of the pressure plate via the friction plate by being pressure-contacted by the friction plate pressed by the pressing member;
a slide shaft coupled to the torque transmission member such as to be rotated together with the torque transmission member and also coupled to the pressure plate such as to move along the axial direction together with the pressure plate, wherein the slide shaft is configured to give a force in the second direction to the pressure plate by receiving a torque from the torque transmission member and moving in the second direction; and
a transmission member for transmitting, to the slide shaft, a portion of the force in the second direction applied to the operating shaft without use of the friction plate when the operating shaft moves in the second direction.

11. The vehicle according to claim 10, wherein, when the pressing member moves in the second direction in association with the movement of the operating shaft in the second direction, the transmission member makes contact with the operating shaft, the pressing member, and the slide shaft to transmit the force in the second direction to the pressing member and the slide shaft.

12. The vehicle according to claim 11,
wherein the slide shaft has an extension portion, one end of which being located closer to the one side than the sub-clutch, the extension portion being arranged radially inward of the sub-clutch and extending along the axial direction to the other side to substantially the same position as the pressing member,
wherein the extension portion has a cam face located on the one side of the transmission member and inclined with respect to the axial direction,
wherein the pressing member has a cam face located on the one side of the transmission member and inclined with respect to the axial direction;
wherein the operating shaft has a flange portion located closer to the other side than the extension portion and protruding radially outward, and
wherein the force transmitting member comprises a plurality of balls arranged between the cam face of the flange portion and the extension portion and the cam face of the pressing member, and along the circumferential direction centering on the axial center of the operating shaft.

13. The vehicle according to claim 12, wherein the pressing member is attached to the extension portion so as to rotate together with the slide shaft.

14. The vehicle according to claim 10,
wherein the slide shaft is configured to move in the second direction together with the torque transmission member, and
wherein the transmission member is a spring mechanism provided between the pressing member and the torque transmission member along the axial direction, the spring mechanism being configured to urge the pressing member in the first direction so as to transmit a portion of the force in the second direction applied to the operating shaft, from the pressing member via the torque transmission member to the slide shaft.

15. The vehicle according to claim 14, wherein the spring mechanism is formed by a leaf spring.

16. The vehicle according to claim 15, wherein the leaf spring is located radially inward of the friction plate with respect to a radial direction of the clutch shaft.

17. The vehicle according to claim 10,
wherein serration inclined with respect to the axial direction of the operating shaft is formed on an outer peripheral surface of the operating shaft,
wherein the torque transmission member and the operating shaft mesh with each other by the serration,
wherein the pressing member is movable in the second direction with the operating shaft,
wherein the slide shaft is fixed to the torque transmission member, and
wherein the serration transmits, to the torque transmission member, a portion of the force in the second direction applied to the operating shaft when the operating shaft moves in the second direction.

18. The vehicle according to claim 10, wherein the vehicle is a motorcycle, and wherein the clutch operator is a clutch lever provided on a handle bar of the motorcycle.

* * * * *